US008408930B1

(12) United States Patent
Simpson et al.

(10) Patent No.: US 8,408,930 B1
(45) Date of Patent: Apr. 2, 2013

(54) MECHANISM FOR FACILITATING CORRECT CARD INSERTION IN ELECTRONIC DEVICES

(75) Inventors: James Aldo Simpson, Waterloo (CA); Jeffrey Charles Bos, Waterloo (CA)

(73) Assignee: Research In Motion Limited (CA)

( * ) Notice: Subject to any disclaimer, the term of this patent is extended or adjusted under 35 U.S.C. 154(b) by 0 days.

(21) Appl. No.: 13/278,239

(22) Filed: Oct. 21, 2011

(51) Int. Cl.
*H01R 13/62* (2006.01)

(52) U.S. Cl. ..................................................... 439/328

(58) Field of Classification Search .......... 439/159–160, 439/327–328, 630, 633
See application file for complete search history.

(56) References Cited

U.S. PATENT DOCUMENTS

| | | | |
|---|---|---|---|
| 6,234,845 B1 * | 5/2001 | Hakozaki | 439/633 |
| 6,398,572 B1 | 6/2002 | Larsson | |
| 6,511,350 B1 | 1/2003 | Ito et al. | |
| 6,871,080 B2 | 3/2005 | Malthouse | |
| 6,892,078 B2 | 5/2005 | Sakaguchi et al. | |
| 6,896,548 B2 | 5/2005 | Scuteri et al. | |
| 7,032,234 B2 * | 4/2006 | Shimazaki et al. | 720/728 |
| 7,160,131 B1 | 1/2007 | Zuo et al. | |
| 7,367,843 B2 | 5/2008 | Chen et al. | |
| 7,583,514 B2 | 9/2009 | Zuo et al. | |
| 7,666,017 B2 | 2/2010 | Chen et al. | |
| 7,823,790 B1 | 11/2010 | Valenzuela et al. | |
| 7,909,628 B2 * | 3/2011 | Yu et al. | 439/159 |
| 7,946,867 B2 * | 5/2011 | Zhou et al. | 439/159 |
| 8,221,143 B2 * | 7/2012 | Yu et al. | 439/159 |
| 2005/0101170 A1 * | 5/2005 | Tanaka et al. | 439/159 |
| 2010/0087074 A1 * | 4/2010 | Yu et al. | 439/81 |
| 2010/0267267 A1 * | 10/2010 | Zhou et al. | 439/328 |

FOREIGN PATENT DOCUMENTS

| | | |
|---|---|---|
| EP | 1746526 B1 | 9/2007 |
| EP | 2323068 A1 | 5/2011 |
| JP | 2000048555 A | 2/2000 |

OTHER PUBLICATIONS

European Search Report; European Application No. 11186157.1-1248; European Filing Date Apr. 12, 2012; Date of Mailing Apr. 19, 2012; 4 pages.

* cited by examiner

*Primary Examiner* — Chandrika Prasad

(74) *Attorney, Agent, or Firm* — Cantor Colburn LLP

(57) ABSTRACT

A slot mechanism for an electronic device is adapted to receive a card therein. The slot mechanism includes a slot disposed within the electronic device. A pivotally moveable tab is spring biased to protrude within an interior of the slot. A spring biased card release mechanism includes a first arm disposed within the interior of the slot and a second arm disposed exterior to the slot. The second arm is configured to prevent movement of the pivotally moveable tab by the card when the card is inserted in an incorrect orientation, thereby preventing complete insertion of the card. The first arm is configured to allow movement of the pivotally moveable tab by the card when the card is inserted in a correct orientation, thereby allowing complete insertion of the card.

20 Claims, 37 Drawing Sheets

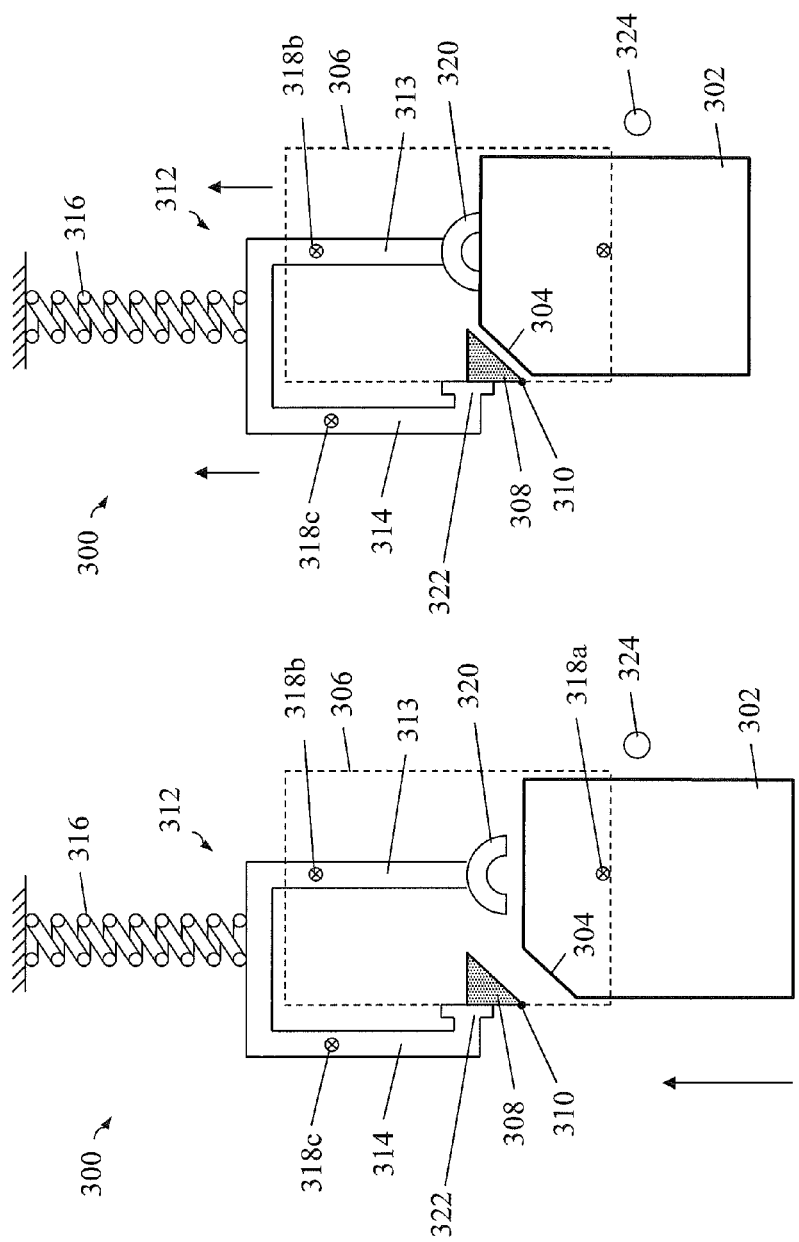

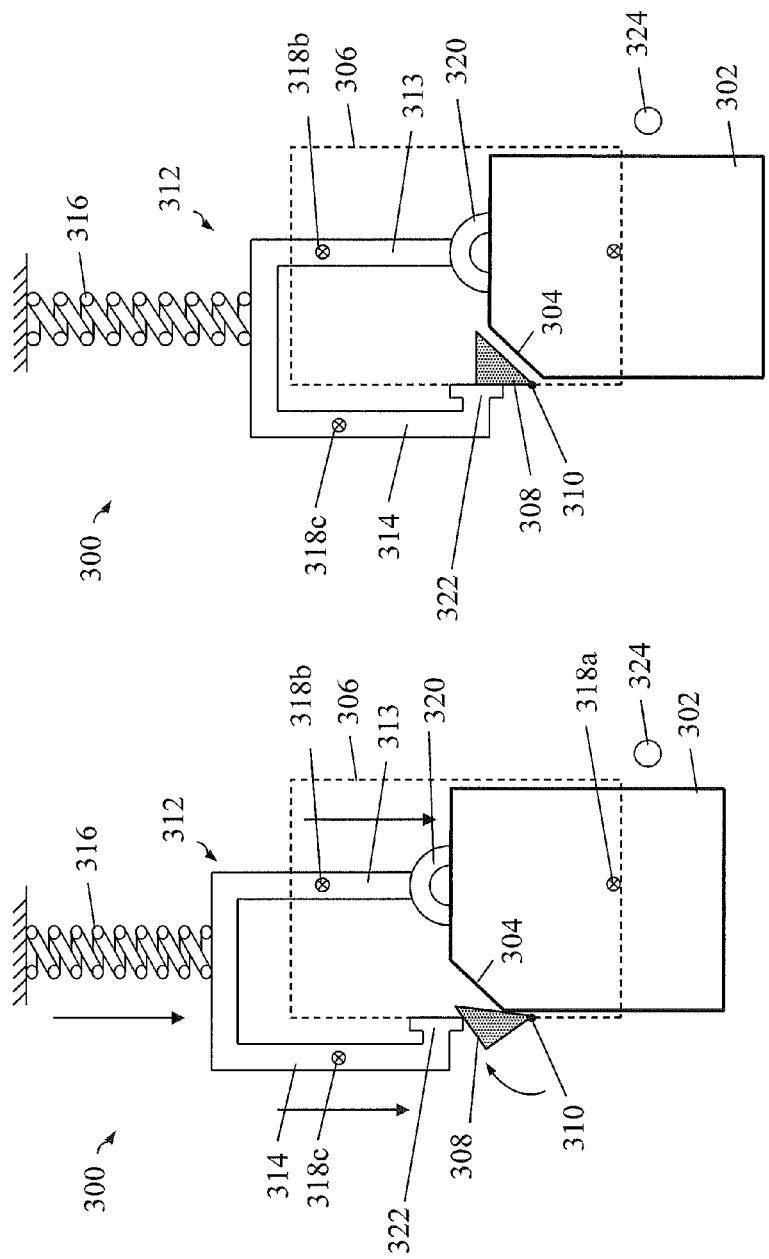

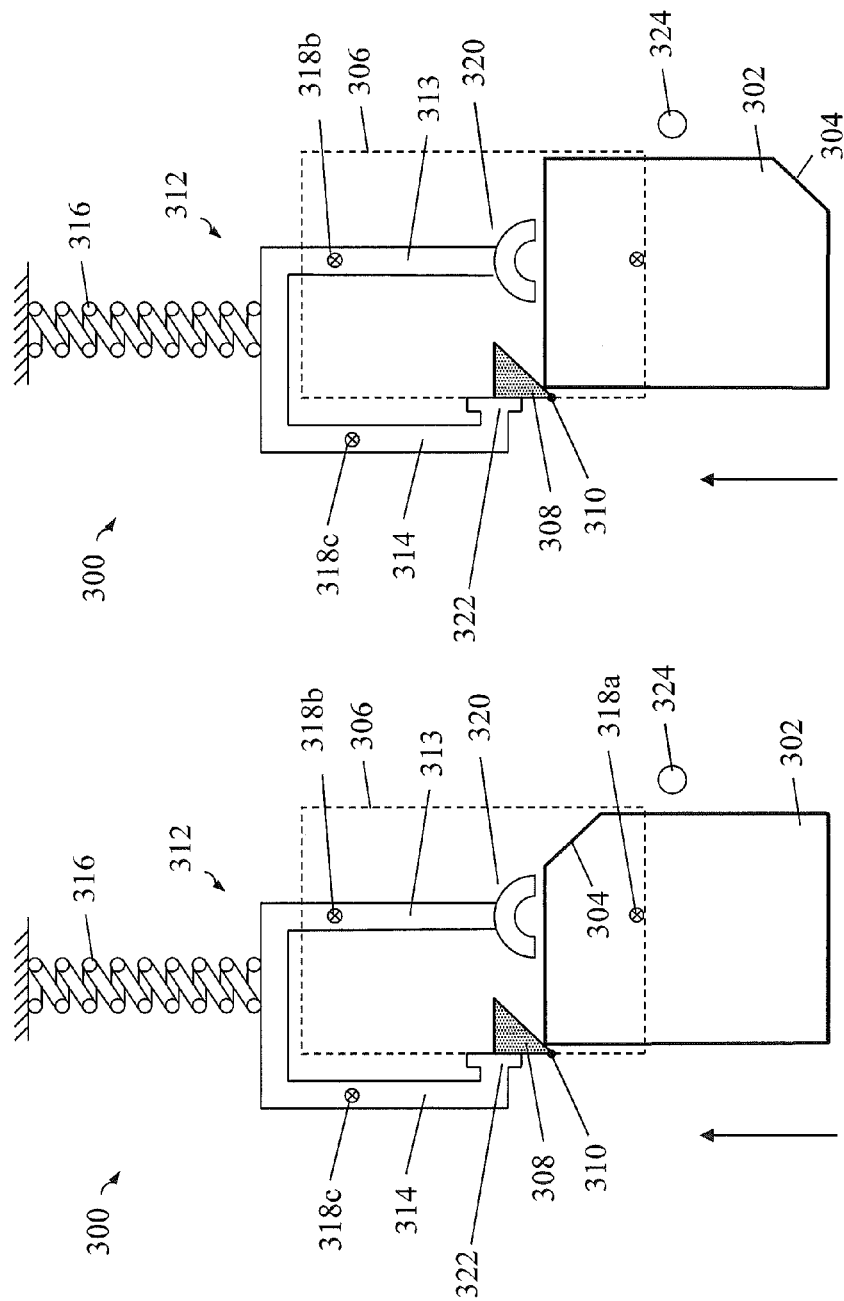

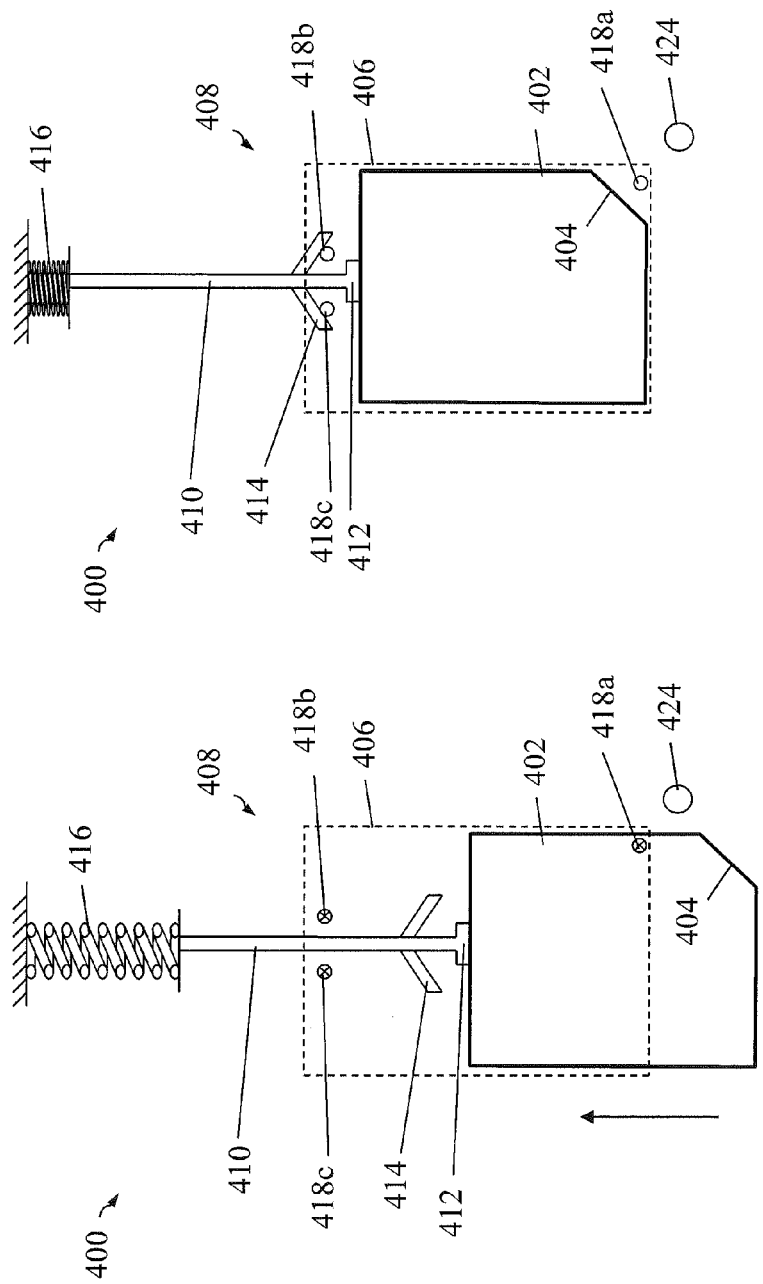

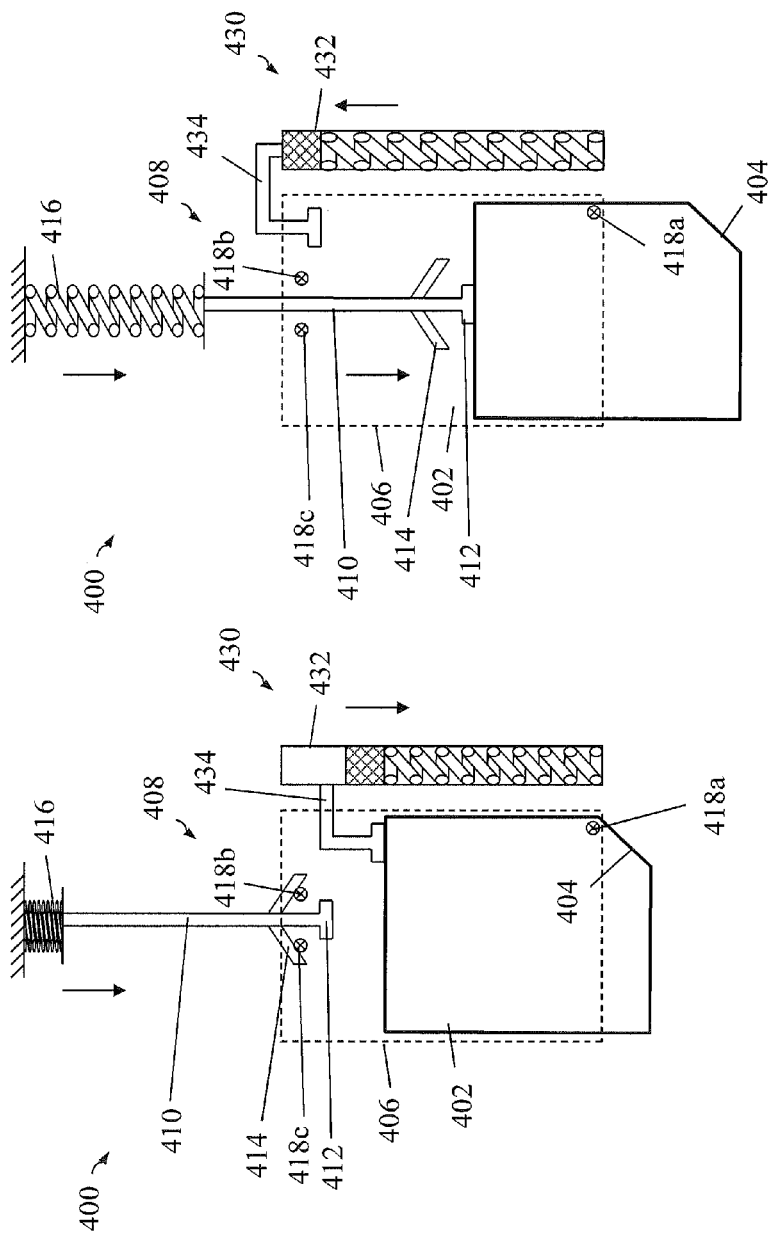

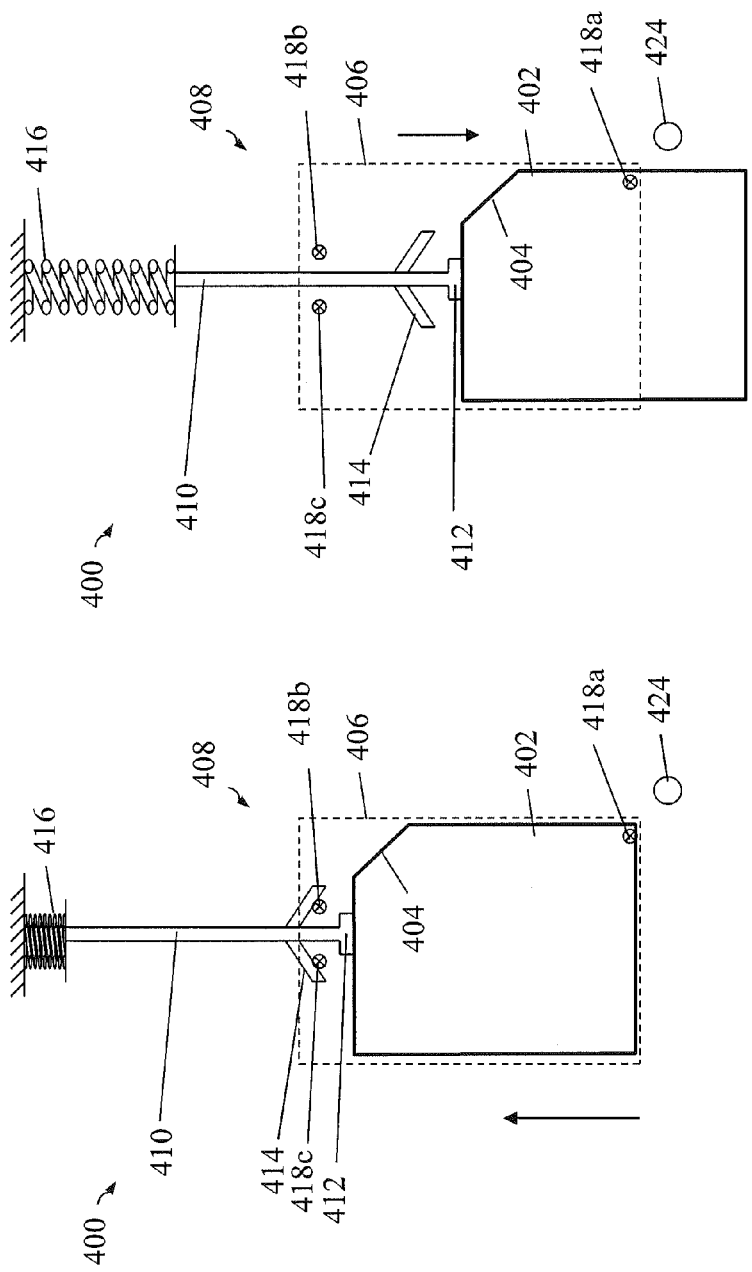

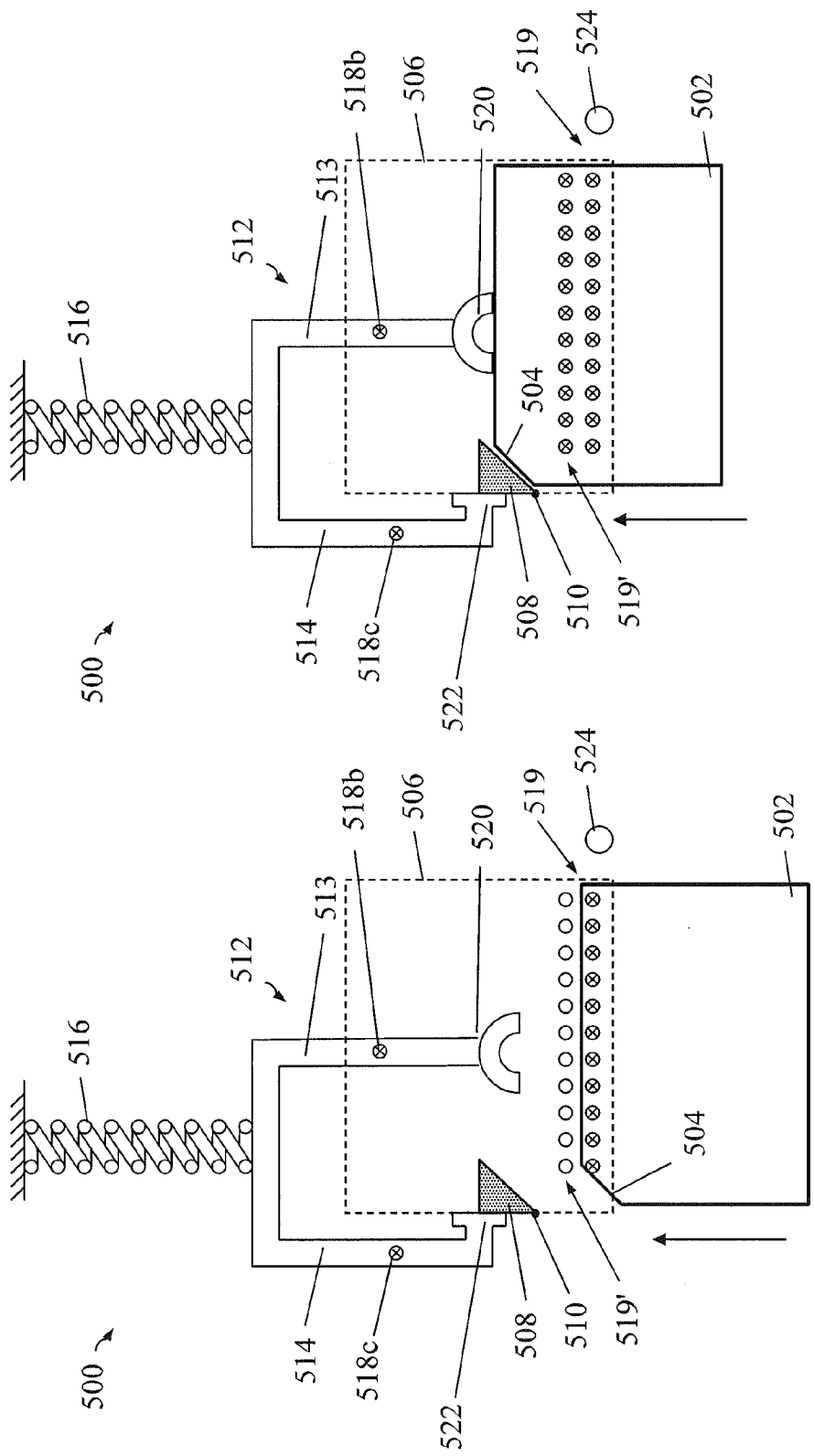

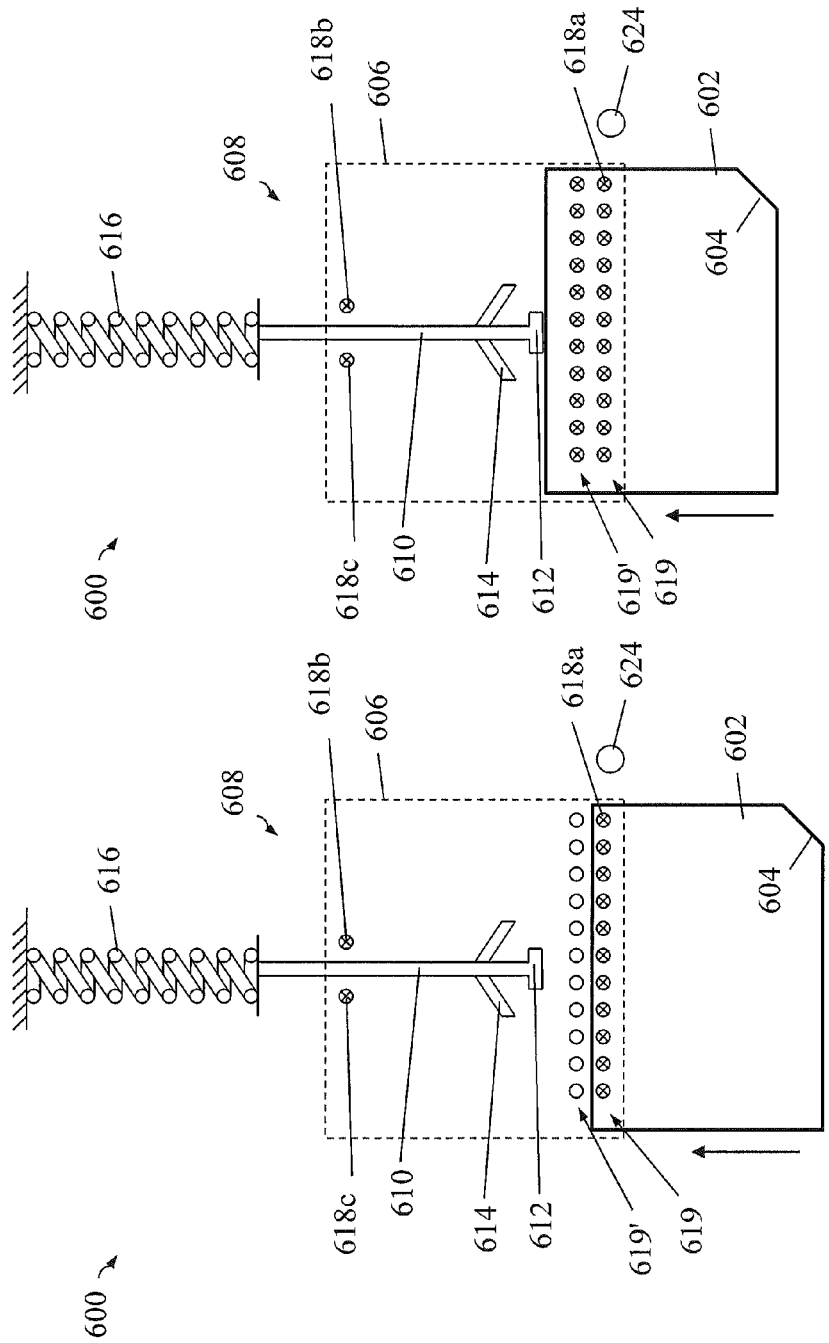

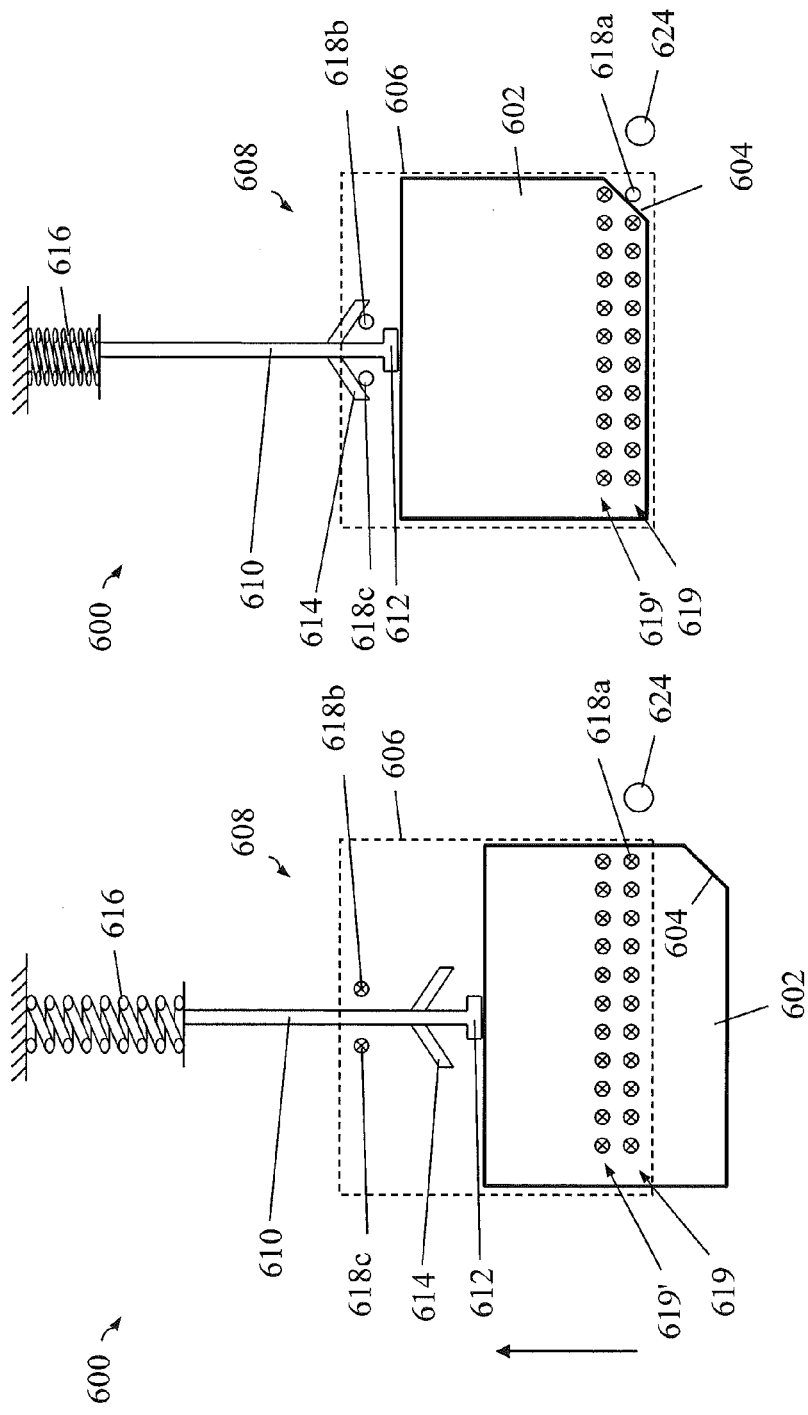

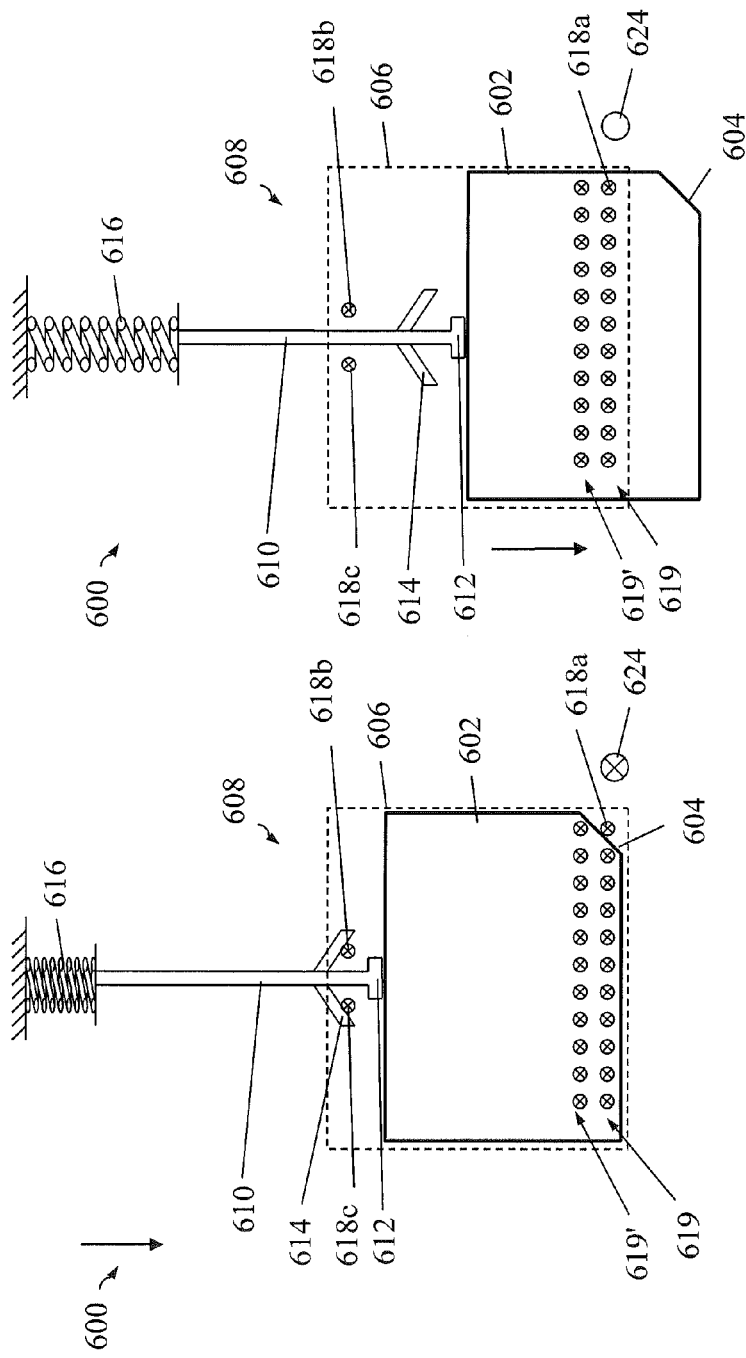

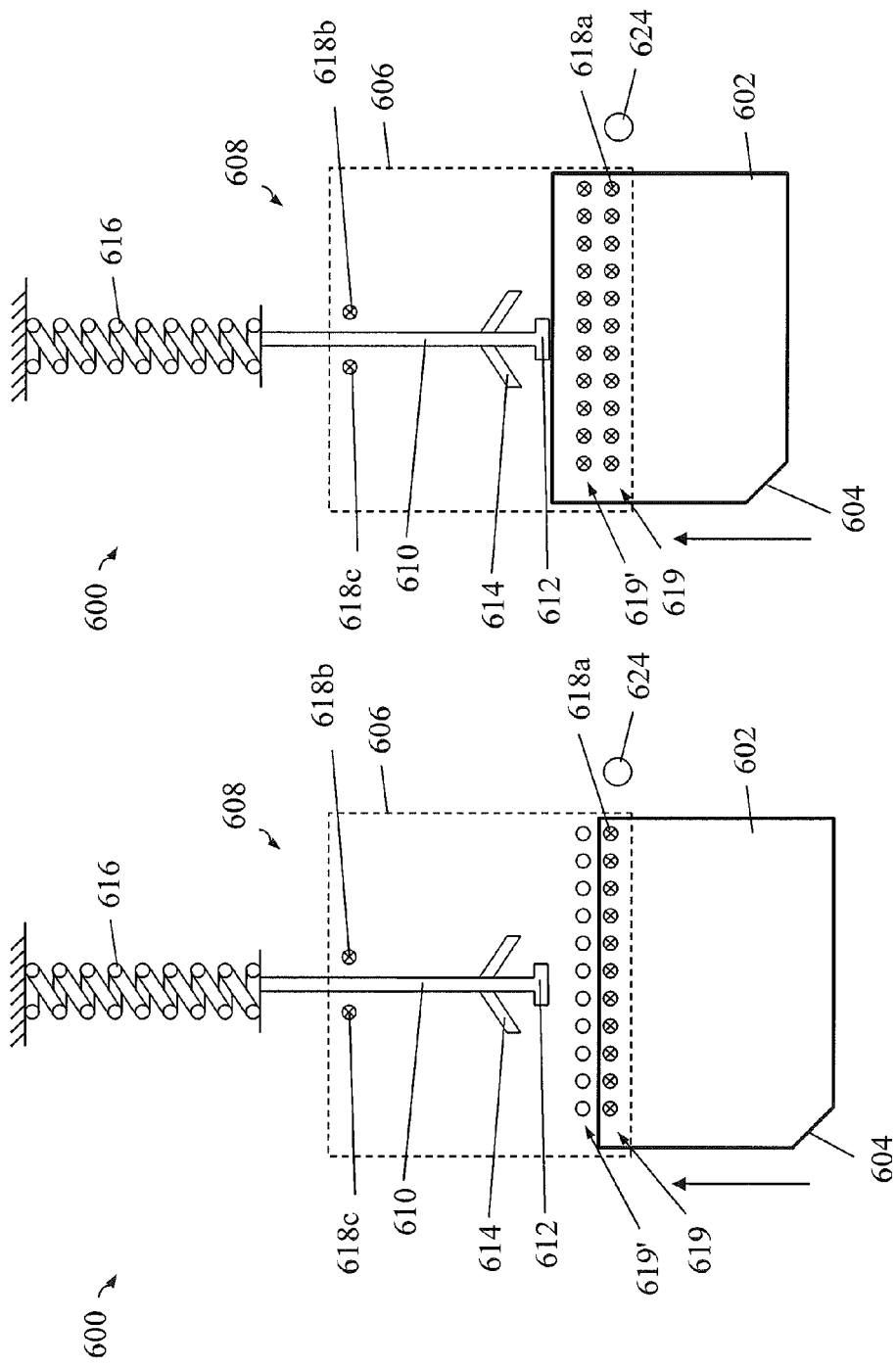

MECHANISM FOR FACILITATING CORRECT CARD INSERTION IN ELECTRONIC DEVICES

BACKGROUND

The present disclosure relates generally to handheld device technologies and, more particularly, to a mechanism for facilitating correct card insertion, such as memory cards, in electronic devices.

Numerous types of handheld electronic devices are known. Examples of such handheld electronic devices include, for instance, personal data assistants (PDAs), handheld computers, two-way pagers, cellular telephones, smart phones, digital cameras, and the like. While many handheld electronic devices also feature wireless communication capability, other handheld electronic devices are stand-alone devices that are functional without communication with other devices. In general, handheld electronic devices are intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon.

Many handheld electronic devices incorporate smart cards therein. A smart card may contain electronic memory, and possibly an embedded integrated circuit (IC). One specific type of smart card is a subscriber identity module (SIM) card, which may be used, for example, in a digital or cellular wireless communication device to encrypt voice and data transmissions. A SIM card may also store data about the device user so that a digital or cellular network can identify and authenticate the user when the network is accessed. Additionally, a SIM card may be used to store the user's personal settings (such as phone numbers, display settings, ring tone settings, etc.).

Typically, handheld electronic devices are designed such that a SIM card is removable by a user. Thus, multiple SIM cards may be swapped into a single handheld electronic device and/or a single SIM card can be swapped between multiple handheld electronic devices. For example, a user may employ a single handheld electronic device for both business and personal communication. Accordingly, a user can assemble (i.e., insert) a first SIM card containing the user's business settings and/or data into the handheld electronic device when conducting a business transaction (e.g., a phone call). After finishing the business transaction, the user can disassemble (i.e., remove) the first SIM card and assemble a second SIM card containing the user's personal settings and/or data into the handheld electronic device before conducting a personal transaction.

Due to the reduced size of handheld electronic devices and SIM cards, however, assembly and disassembly of the SIM cards can be problematic. During assembly, for example, a user may not be able to properly align the SIM card within the handheld electronic device's SIM cardholder frame thus making proper seating of the SIM card difficult if not impossible. During disassembly, a user may not be able to easily grasp the SIM card after it has been unseated from the SIM cardholder frame. Thus, the user may be forced to flip over the handheld electronic device so that the SIM card falls away from the device, which increases the risk that the SIM card will be dropped and damaged.

BRIEF DESCRIPTION OF THE DRAWINGS

For a more complete understanding of this disclosure, reference is now made to the following brief description, taken in connection with the accompanying drawings and detailed description, wherein like reference numerals represent like parts:

FIGS. 3(a) through 3(k) are a series of schematic diagrams illustrating a first exemplary embodiment of a memory card slot mechanism for electronic devices;

FIGS. 5(a) through 5(l) are a series of schematic diagrams illustrating a third exemplary embodiment of a memory card slot mechanism for electronic devices;

DETAILED DESCRIPTION

Figure 2:
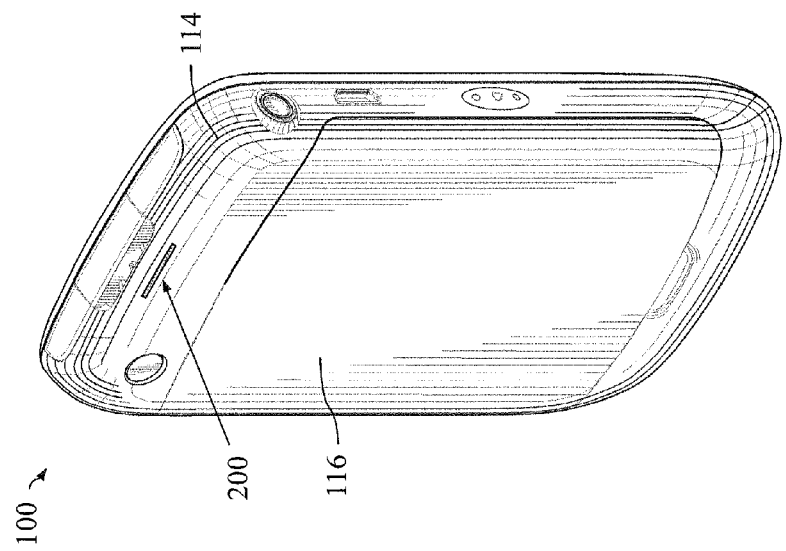
FIG. 2 is a perspective view of a back side of the handheld electronic device of FIG. 1.

Existing card slot designs (e.g., for SIM cards) may allow for the card to be inserted into an electronic device in an incorrect orientation. In this case, a device owner may not become aware that the card was inserted incorrectly until after device power up, and upon receiving an error indication or an inability to register with a network, for example. This in turn may frustrate the owner and lead to an unsatisfactory "out-of-box" experience.

One common conventional design feature is to provide a pictorial image that displays the proper orientation of the card relative to a receiving slot adjacent thereto. Alternatively, a card slot may include a securing fastener over a portion of the opening such that the card is physically held in place once inserted therein. If inserted improperly, the card may slightly bulge out of the card slot, which could indicate improper insertion. Another slot design incorporates the use of a sleeve into which the owner inserts the card. Although insertion of the card into the sleeve in an incorrect orientation will not allow the sleeve to be closed and locked, it is still possible to insert the card into the sleeve in a correct orientation and the sleeve may still fail to close and lock. This is due to the card not precisely aligning with the contours of the sleeve.

Still another conventional design involves the use of a memory card carrier that receives the memory card and is in turn inserted into a slot of the electronic device. Although it is difficult to improperly insert a memory card within the card carrier, it may be difficult to initially locate and remove the card carrier from the slot. Moreover, a purchaser of a new device could incorrectly assume that the card carrier is a memory card placeholder and simply discard the carrier.

In view of the above, disclosed herein are various embodiments of a mechanism for facilitating correct memory card insertion in electronic devices, such as for a memory card. It should be appreciated that the term "card" as described herein may refer to a memory card, such as a SIM card, or other type of electronic card (e.g., PCMCIA). For ease of description, the term "memory card" is used hereinafter. In embodiments described herein, card slot designs are provided for both landscape and portrait card insertion, as well as for a card notch portion either inserted first or last. As a result, correct card insertion results in the memory card sliding fully into the slot without any resistance from the device. Conversely, incorrect card insertion results in either immediate resistance to prevent the card from being fully inserted into the slot or alternatively ejecting the card after complete insertion.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature(s) being described. Also, the description is not to be considered as limiting the scope of the embodiments described herein.

Figure 1:
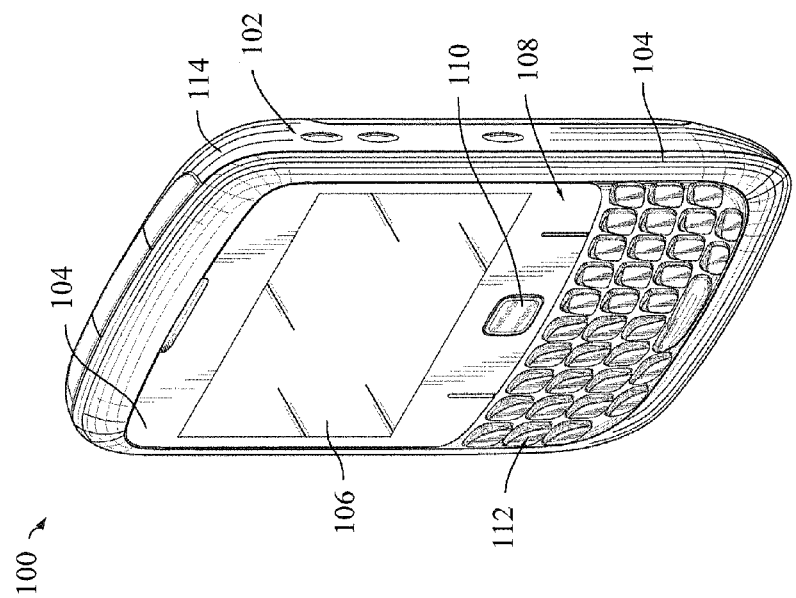
FIG. 1 is a perspective view of an example of a handheld electronic device suitable for use in accordance with the present disclosure.

Referring initially to FIGS. 1 and 2, an example of a handheld electronic device 100 suitable for use in accordance with the present disclosure is shown. As particularly shown in FIG. 1, the handheld electronic device 100 may include a housing 102 that protects the internal components of the device, such as a microprocessor, printed circuit board and other components (not shown), as known in the art. A front face 104 of the device 100 includes a display 106, a navigation key panel 108, a navigation device (such as an optical navigation module, as shown, or a trackball, trackpad, or joystick, for example) 110, and a keyboard 112, which can include a plurality of keys arranged in a keyboard layout and having character indicia thereon. The keyboard 112 can be a physical keyboard with actuatable keys, as shown, or it can be a virtual keyboard presented on a touch screen display. It is appreciated that the device 100 can include additional or fewer external components, such as side buttons, a camera, a USB port, and the like, and the device 100 is not limited to the features disclosed herein.

As particularly shown in FIG. 2, a back face 114 of the device 100 includes a back cover or battery door 116 configured to enclose a battery (not shown) of the device. The back cover 116 may be removably attached to the back face 114 by a plurality of hooks/tabs and mating or inter-fitting corresponding notches/openings. More specifically, the back cover 116 may be "snap-fit" into the back face 114, although it is appreciated that alternative structures for securing the back cover to the back face may be appropriate, such as a rail/ groove structure or a tab/slot structure, for example. As also shown in FIG. 2, a memory card slot mechanism 200 is provided in the back face 114 of the electronic device so as to receive a memory card (e.g., a SIM card) therein, embodiments of which will be described in further detail below. However, it will be appreciated that the possible locations or orientations of the memory card slot mechanism 200 with respect to the electronic device 100 are not so limited as depicted in the Figures, and that other locations are also possible.

It will also be understood that the components required for mobile communication device operation (or, more generally, for electronic device operation) are not fully shown in FIGS. 1 and 2 or described herein as they are not material to the understanding of the method and apparatus for providing an assembly for housing a memory card for a mobile communication device.

Referring generally now to FIGS. 3(a) through 3(k), there is shown a series of schematic diagrams illustrating a first exemplary embodiment of a memory card slot mechanism 300 for electronic devices (such as the device 100 shown in FIGS. 1 and 2). In this embodiment, the slot mechanism 300 has a portrait configuration with respect to a rectangular shaped memory card 302 having a notched edge 304 (hereinafter referred to as a "notch"), wherein a correct orientation of the memory card 302 when inserted into a slot portion 306 (hereinafter referred to as a "slot") of the slot mechanism 300 has the notch side inserted first.

Figure 3A:
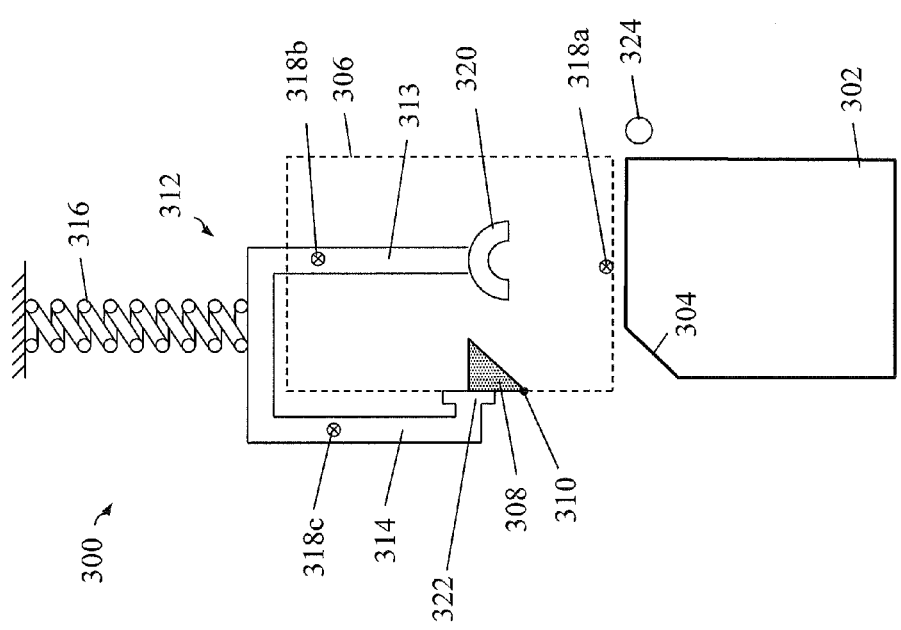

As more particularly shown in FIG. 3(a), the slot mechanism 300 further includes a triangular shaped tab 308 that protrudes into an interior of the slot 306. The specific position and shape of the tab 308 may be tailored in accordance with the memory card geometry. The tab 308 is pivotally attached at a corner thereof by a torsion spring 310 (having a longitudinal axis running into the figure), which biases the tab 308 to an interior position shown in FIG. 3(a). A card release mechanism, shown generally at 312, includes a first arm 313 disposed within the interior of the slot 306 and a second arm 314 disposed exterior to the slot 306. The first and second arms 313, 314 are biased in a downward orientation with respect to FIG. 3(a) by a biasing spring 316.

As further shown in FIG. 3(a), the slot mechanism 300 additionally includes three locking pins; a primary pin 318a located at the front of the slot 306, and two secondary pins 318b, 318c, mechanically interlocked with pin 318a. Pin 318b is located at a back of the slot 306, while pin 318c is located exterior to the slot 306. The three locking pins are spring loaded and require very little force to become depressed. As depicted in the figures, where the pins are marked with an "x," they are in a depressed position with respect to the slot 306. That is, the pins do not extend within the slot 306 itself. However, where the pins are not marked with an "x," they are in a released position and the longitudinal axes thereof extend at least partially into the slot 306. Thus, prior to memory card insertion, secondary pins 318b and 318c are held in a depressed position by first and second arms 313, 314, respectively, causing primary pin 318a to also be held in a depressed position. As will be explained in further detail below, the first arm 313 includes a c-shaped post 320 disposed at an end thereof opposite the biasing spring 316, while the second arm 314 includes a door 322 disposed at an end thereof opposite the biasing spring 316. A release button 324 may also be provided as one embodiment of a card release mechanism, wherein the release button 324 is mechanically interlocked with the locking pins 318a, 318b, 318c.

FIGS. 3(b) through 3(e) illustrate a sequence in which the memory card 302 is inserted into the slot 306 in the correct orientation. That is, the notch 304 is aligned to the tab 308 biased within the slot 306. When the card 302 is initially inserted into the card slot 306 as shown in FIG. 3(b), a leading edge of the card 302 causes the primary locking pin 318a to become depressed and forced out of the slot 306 (into the page of the FIGURES. This action may be facilitated by any manner known to one skilled in the art, such as by having a pin structure where the top of the pin has a beveled or slanted surface such that the edge of the card would tend to initially "ride" up the surface of the pin and begin to force it in a downward direction. As the card 302 moves further within the interior of the slot 306 as shown in FIG. 3(c), the location of the tab 308 is such that it does not yet make contact with the notch 304. This in turn allows the leading edge of the card 302 to come into contact with the c-shaped post 320, and begins to move the card release mechanism 312 in an upward direction (i.e., toward the back of the slot 306) against the bias of the biasing spring 316.

Figures 3D, 3E:
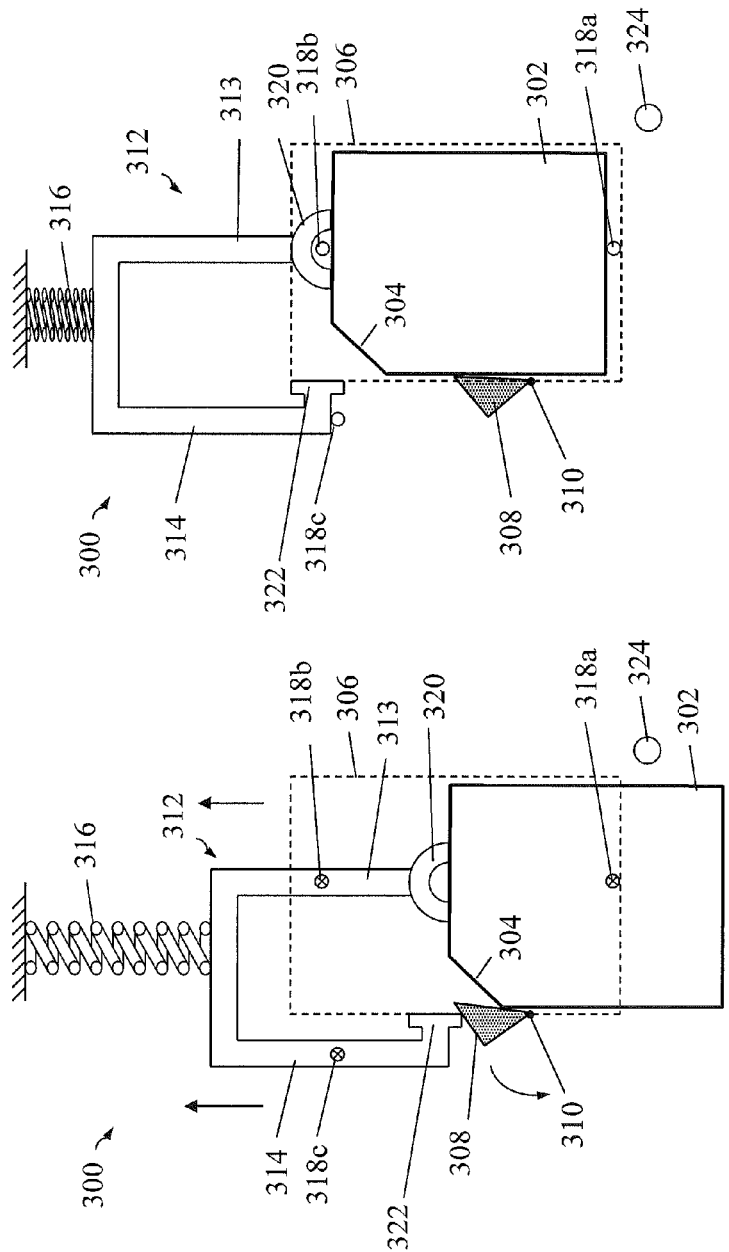

As then shown in FIG. 3(d), further insertion of the card 302 now causes the notch 304 to make contact with the tab 308 and cause the tab to pivot outward from the slot 306, against the bias of the torsion spring 310. Notably, the door 322 attached to the second arm 314 has traveled a sufficient distance upward such that the door 322 does not prevent the card 302 from forcing the tab 308 pivotally outward. Eventually, full insertion of the card 302 as shown in FIG. 3(e) causes the card release mechanism 312 to clear the area above the locking pins 318b and 318c, while a trailing edge of the card 302 clears the locking pin 318a. As a result, the locking pins 318a, 318b and 318c each spring up within the slot 306, in turn preventing the card release mechanism 312 from ejecting the card 302 once the user has fully inserted the card 302.

Figures 3F, 3G:
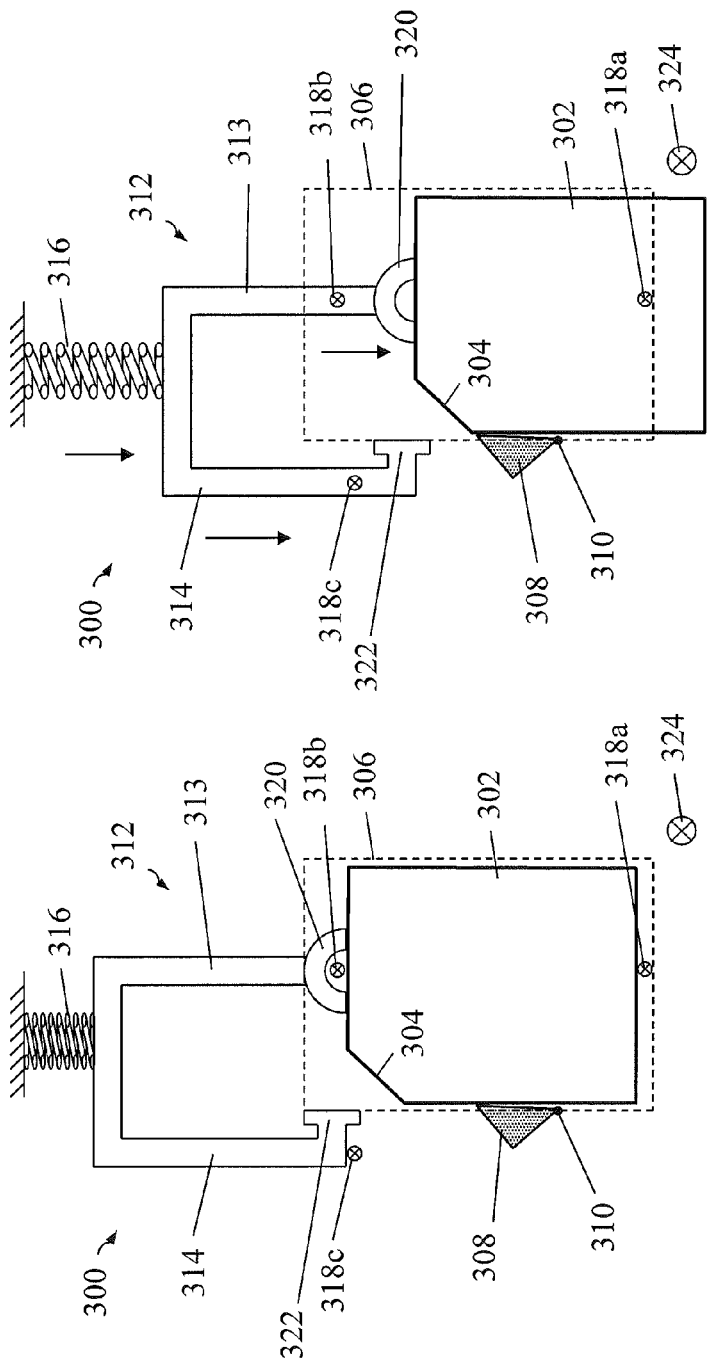

Release of the card 302 may, in one embodiment, be accomplished through the use of the release button 324. By depressing the button 324 as indicated in FIG. 3(f), the locking pins 318a, 318b and 318c are each caused to be depressed due to the interlocking relationship therebetween. This allows the card release mechanism 312 to freely move down the card slot (i.e., towards an outer edge of the slot 306) by the compressed energy of the biasing spring 316, as shown in FIG. 3(g). As the card 302 continues to be pushed out of the slot 306, the notch 304 begins to move past the outwardly disposed tab 308, which in turn causes the torsion spring 310 to pivotally return the tab 308 back into the slot 306, as illustrated in FIG. 3(h). Here again, the position of the door 322 still permits the tab 308 to pivot back into the slot 306. Finally, in FIG. 3(i), the card release mechanism 312 is completely returned to the unloaded configuration similar to FIG. 3(c), and the card 302 may then be completely pulled out of the slot 306 by the user.

Referring now to FIGS. 3(j) and 3(k), there are illustrated two exemplary scenarios of where the memory card 302 is incorrectly inserted into the slot 306. That is, the notch 304 does not align with the tab 308. In FIG. 3(j), although the card 302 is inserted "notch first", the notch 304 is on the opposite side of the slot 306 with respect to the tab 308. Although the top left corner of the card 302 engages the tab 308, the position of the door 322 remains in its initial position, preventing the tab 308 from being pivoted outward. This is because the improper alignment prevents the leading edge of the card 302 from contacting the post 320 and forcing the card release mechanism 312 upward such that the door 322 is moved away from the tab 308. Accordingly, the card 302 goes no further than is shown in FIG. 3(j), and the user is provided with visual and tactile feedback that the card 302 is inserted incorrectly. A similar example is shown in FIG. 3(k). In this case, the card 302 is inserted "notch last" but with the same results, in that the contact between the corner of the card 302 and the tab 308 prevents the card from reaching the post 320, which in turn does not allow the door 322 to be moved. Consequently, the tab 308 cannot be moved and the card 302 goes no further than is shown in FIG. 3(k).

Figure 4A:
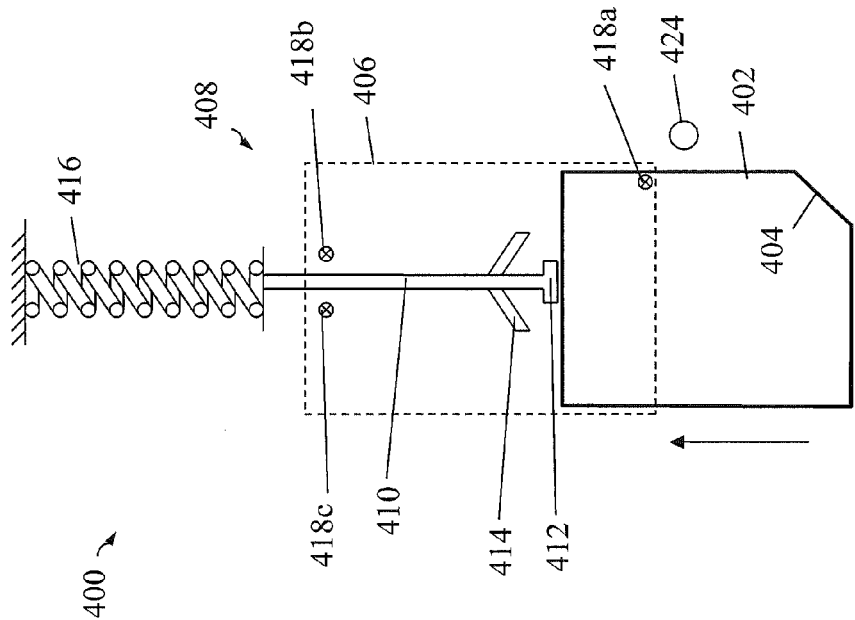
FIGS. 4(a) through 4(n) are a series of schematic diagrams illustrating a second exemplary embodiment of a memory card slot mechanism for electronic devices.

Referring generally now to FIGS. 4(a) through 4(n), there are shown a series of schematic diagrams illustrating a second exemplary embodiment of a memory card slot mechanism 400 for electronic devices. In this embodiment, the slot mechanism 400 has a portrait configuration with respect to a rectangular shaped memory card 402 having a notch 404. In contrast to the first embodiment, a correct orientation of the memory card 402 when inserted into the slot 406 of the slot mechanism 400 has the notch side inserted last.

As more particularly shown in FIG. 4(a), the slot mechanism 400 further includes a card release mechanism, shown generally at 408, having an arm 410 with a post 412 disposed at a first end thereof. The arm 410 further includes wing portions 414 proximate the post 412 and is partially disposed within the interior of the slot 406. The arm 410 is biased in a downward orientation with respect to FIG. 4(a) by a biasing spring 416 in contact with a second end of the arm 410.

As further shown in FIG. 4(a), the slot mechanism 400 additionally includes three locking pins; a primary pin 418a located at a right front portion of the slot 406, and two secondary pins 418b, 418c, mechanically interlocked with pin 418a, located at a back of the slot 406 and on opposing sides of the arm 410. The three locking pins are spring loaded and require very little force to become depressed. As depicted in the figures, where the pins are marked with an "x," they are in a depressed position with respect to the slot 406. That is, the pins do not extend within the slot 406 itself. However, where the pins are not marked with an "x," they are in a released position and the longitudinal axes thereof extend at least partially into the slot 406. Thus, prior to memory card insertion, primary pin 418a and secondary pins 418b and 418c are in a released position. As will be explained in further detail below, a release button 424 may also be provided as one embodiment of a card release mechanism, wherein the release button 424 is mechanically interlocked with the locking pins 418a, 418b, 418c.

Figure 4B:
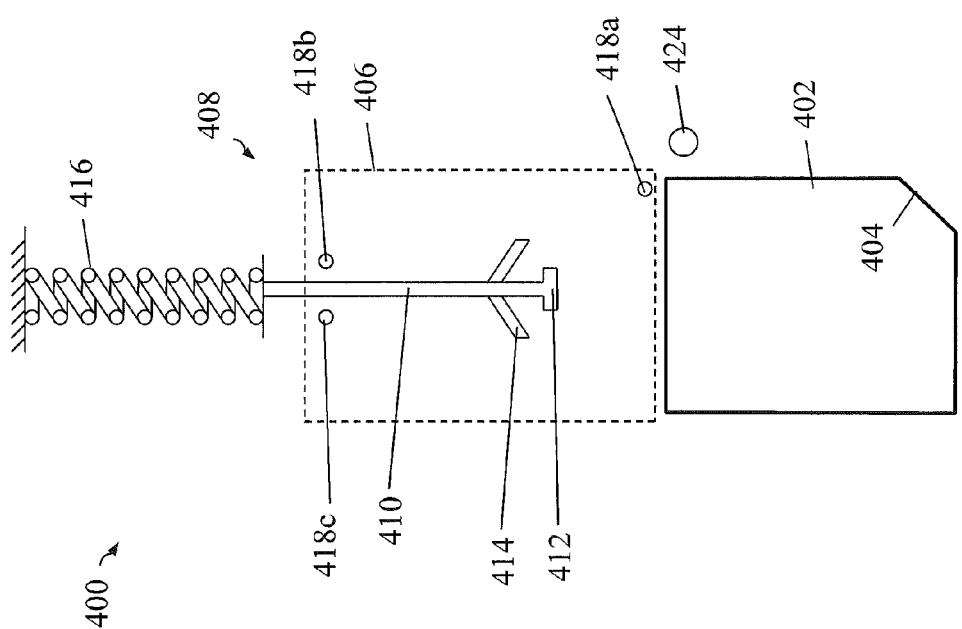

FIGS. 4(b) through 4(d) illustrate a sequence in which the memory card 402 is inserted into the slot 406 in the correct orientation. That is, the notch 404 is aligned to the location of locking pin 418a. When the card 402 is initially inserted into the card slot 406 as shown in FIG. 4(b), a leading edge of the card 402 causes the primary locking pin 418a (and thus pins 418b and 418c) to become depressed and forced out of the slot 406 (into the page of the figure). As the card 402 moves further within the interior of the slot 406 as shown in FIG. 4(c), the leading edge of the card 402 comes into contact with the post 412, and begins to move the card release mechanism 408 in an upward direction (i.e., toward the back of the slot 406) against the bias of the biasing spring 416.

As then shown in FIG. 4(d), further insertion of the card 402 now causes the notch 404 to move past the location of locking pin 418a, thereby causing each of the locking pins 418a, 418b and 418c to spring up within the slot 406. Because the wing portions 414 of the arm 410 are now located behind pins 418b and 418c within the slot 406, the card release mechanism 408 is prevented from ejecting the card 402 once the user has fully inserted the card 402.

Figures 4E, 4F:
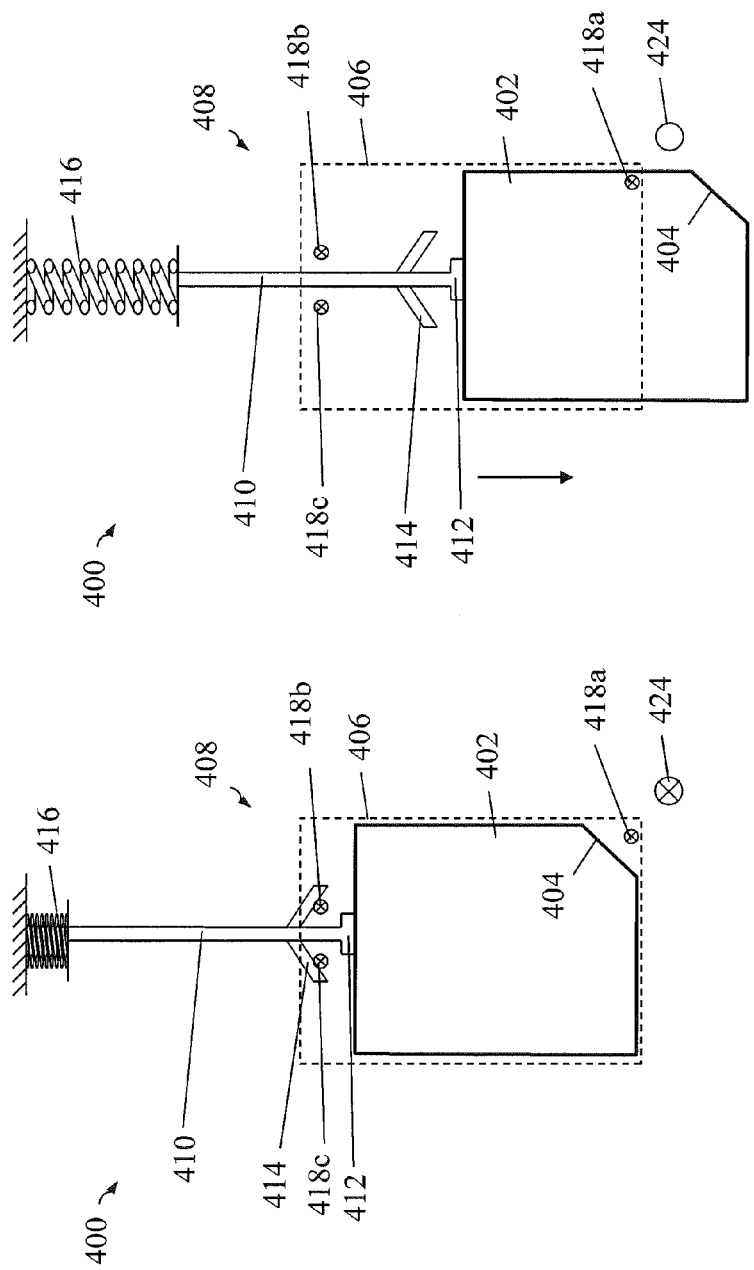

Release of the card 402 may, in one embodiment, be accomplished through the use of the release button 424. By depressing the button 424 as indicated in FIG. 4(e), the locking pins 418a, 418b and 418c are each caused to be depressed due to the interlocking relationship therebetween. This allows the card release mechanism 408 to freely move down the card slot by the compressed energy of the biasing spring 416, as shown in FIG. 4(f).

Figures 4G, 4H:
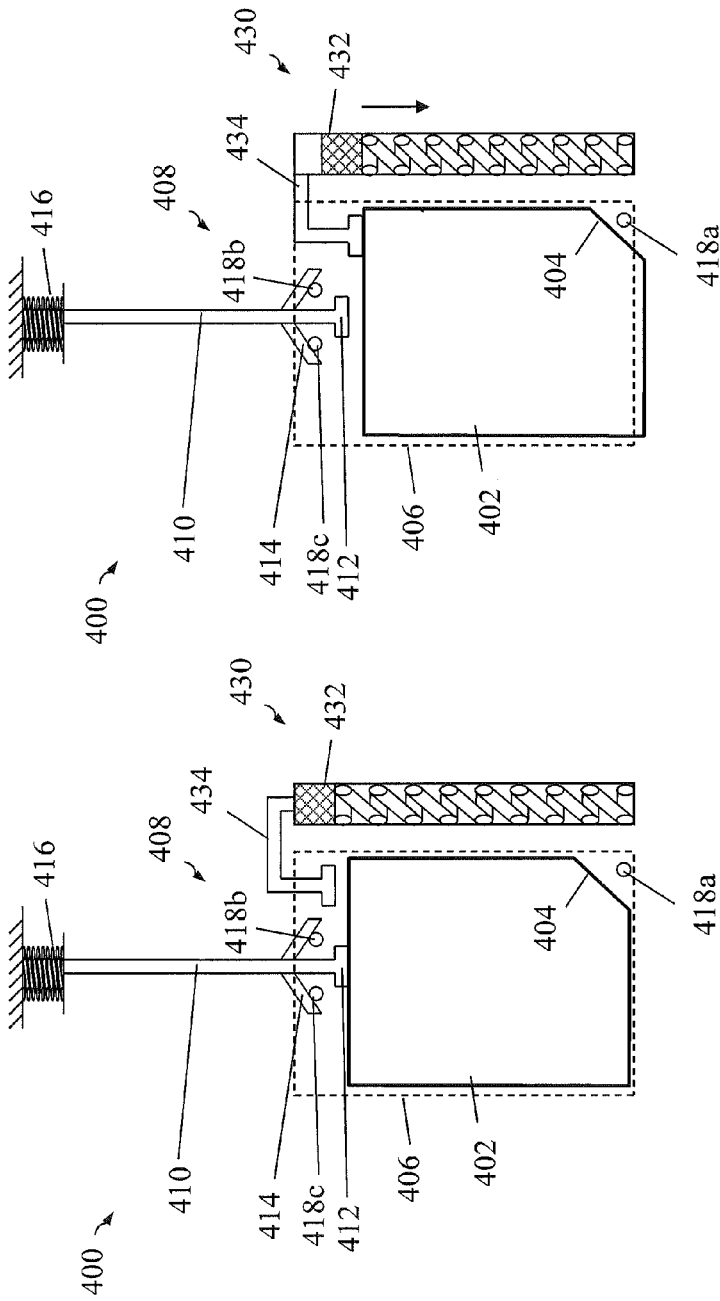

In an alternative embodiment, FIGS. 4(g) through 4(j) depict another possible mechanism that may be used to eject the card 402. In this embodiment, the ejection mechanism 430 includes a spring biased slider 432 that is capable of being moved (in a downward direction in the figures) by a user. The slider 432 is coupled to a slider arm 434 that, in a standby position, rests at the back of the slot 406 and clear of any interference with insertion of the card or with the card release mechanism 408. When the slider 432 is engaged by a user as shown in FIG. 4(h), the slider arm 434 engages the back edge of the card 402 and begins to push the card 402 out from the slot 406. The card 402 will then come in contact with locking pin 418a, as shown in FIG. 4(i), causing it to be depressed. Once locking pin 418a becomes depressed, pins 418b and 418c also become depressed as these pins are interlocked as stated above. The card release mechanism 408 is then free to move down the card slot by the compressed energy of the biasing spring 416, as shown in FIG. 4(j), while the spring biased slider 432 returns to its standby position.

Figure 4K:
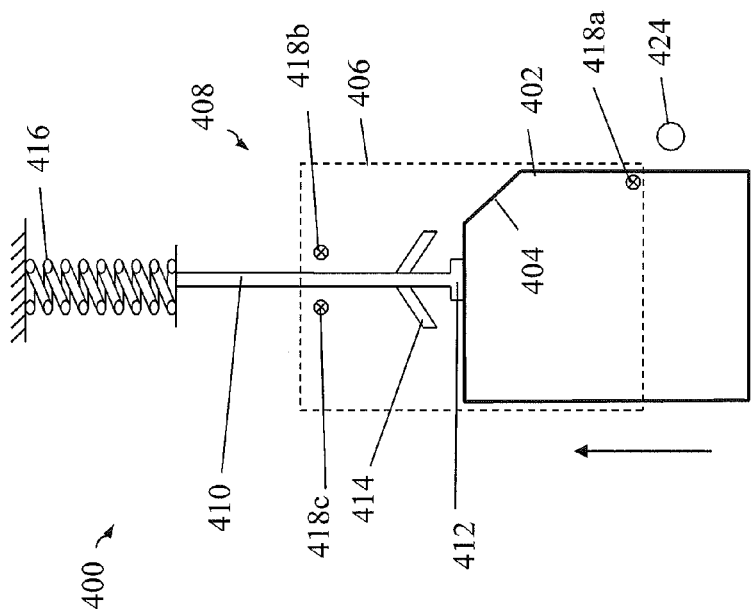
Figure 4L:
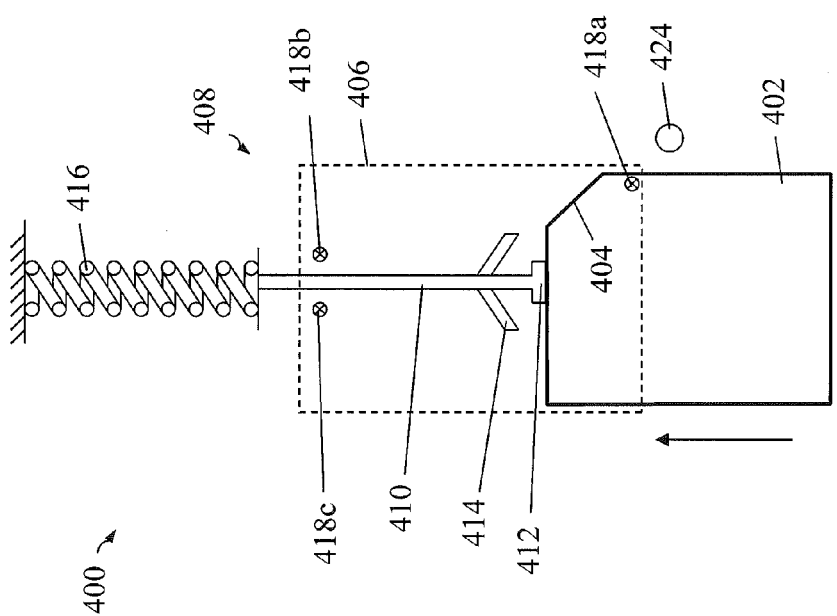

Referring now to FIGS. 4(k) through 4(n), there is illustrated an exemplary scenario of where the memory card 402 is incorrectly inserted into the slot 406. That is, the notch 404 does not align with the locking pin 418a when the card 402 is fully inserted. In FIG. 4(k), regardless of how the card 402 is initially inserted, the locking pin 418a will initially be depressed by the card 402. Locking pins 418b and 418c in turn also become depressed. As the card 402 continues to be slid through the slot in FIG. 4(l), locking pins 418a, 418b and 418c remain depressed, since the card 402 continues to exert downward pressure on locking pin 418a.

However, once the card 402 is fully inserted into the slot 406 as shown in FIG. 4(m), it will be seen that the location of the notch 404 does not correspond to the location of the locking pin 418a. As a result, the locking pin 418a remains depressed by the card 402, as do the locking pins 418b and 418c. Therefore, there is nothing to prevent the card release mechanism 408 from ejecting the card 402 due to the bias of spring 416, as shown in FIG. 4(n).

In addition to a memory card slot mechanism having a portrait orientation, it is also contemplated that the slot may also have a landscape orientation so as to accommodate a memory card inserted in a landscape orientation. In this regard, FIGS. 5(a) through 5(l) are a series of schematic diagrams illustrating a third exemplary embodiment of a memory card slot mechanism 500 for electronic devices. In this embodiment, the slot mechanism 500 has a landscape configuration with respect to a rectangular shaped memory card 502 having a notch 504, in which a correct orientation of the memory card 502 when inserted into a slot 506 of the slot mechanism 500 has the notch side inserted first.

Figure 5A:
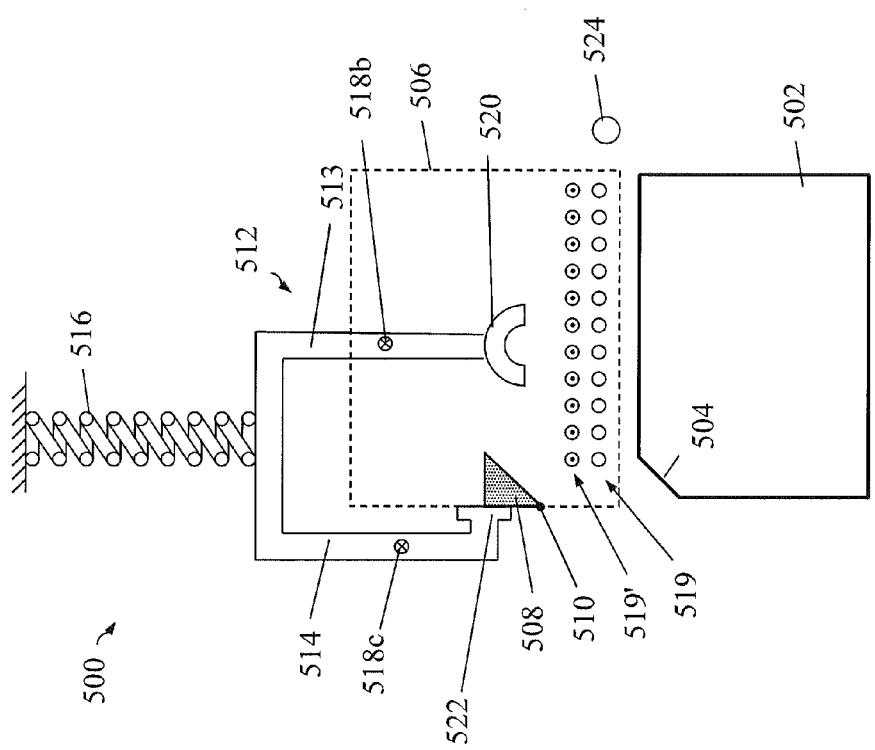

As more particularly shown in FIG. 5(a), the slot mechanism 500 further includes a triangular shaped tab 508 that protrudes into an interior of the slot 506. The specific position and shape of the tab 508 may be tailored in accordance with the memory card geometry. The tab 508 is pivotally attached at a corner thereof by a torsion spring 510 (having a longitudinal axis running into the figure), which biases the tab 508 to an interior position shown in FIG. 5(a). A card release mechanism, shown generally at 512, includes a first arm 513 disposed within the interior of the slot 506 and a second arm 514 disposed exterior to the slot 506. The first and second arms 513, 514 are biased in a downward orientation with respect to FIG. 5(a) by a biasing spring 516.

As further shown in FIG. 5(a), the slot mechanism 500 additionally includes a pair of locking pins, 518b, 518c. Pin 518b is located at a back of the slot 506, while pin 518c is located exterior to the slot 506. The locking pins are spring loaded and require very little force to become depressed. As depicted in the figures, where the pins are marked with an "x," they are in a depressed position with respect to the slot 506. That is, the pins do not extend within the slot 506 itself. However, where the pins are not marked with an "x," they are in a released position and the longitudinal axes thereof extend at least partially into the slot 506. As will also be noted in the present embodiment, the slot 506 also includes a first row 519 of spring-loaded pins located closest to the card slot opening. This first row 519 of pins may be freely depressed by anything that comes in contact with it. There is also a second row 519' of spring-loaded pins located directly behind the first row 519 of pins. The second row 519' of pins may be in one of three states. The first state, which may be referred to as a locked state (depicted with a small dot in the center of each pin in the figures), means that the pin cannot become depressed by anything that comes in contact with it. The second state, which may be referred to as the unlocked state, means that the pin can become depressed by anything that comes in contact with the pin. The third state occurs when the pin becomes fully depressed by whatever comes in contact with that pin (again, denoted with a small "x" in the figures).

Similar to the first embodiment, the first arm 513 includes a c-shaped post 520 disposed at an end thereof opposite the biasing spring 516, while the second arm 514 includes a door 522 disposed at an end thereof opposite the biasing spring 516. A release button 524 may also be provided as one embodiment of a card release mechanism, wherein the release button 524 is mechanically interlocked with the locking pins 518b, 518c.

FIGS. 5(b) through 5(e) illustrate a sequence in which the memory card 502 is inserted into the slot 506 in the correct orientation. That is, the notch 504 is aligned to the tab 508 biased within the slot 506. When the card 502 is initially inserted into the card slot 506 as shown in FIG. 5(b), a leading edge of the card 502 depresses the entire first row 519 of pins. Once the first row 519 of pins are depressed, this causes the second row 519' of pins to be unlocked, as shown in FIG. 5(b). As the card 502 moves further within the interior of the slot 506 as shown in FIG. 5(c), the location of the tab 508 is such that it does not yet make contact with the notch 504. This in turn allows the leading edge of the card 502 to come into contact with the c-shaped post 520, and begins to move the card release mechanism 512 in an upward direction (i.e., toward the back of the slot 506) against the bias of the biasing spring 516.

Figures 5D, 5E:
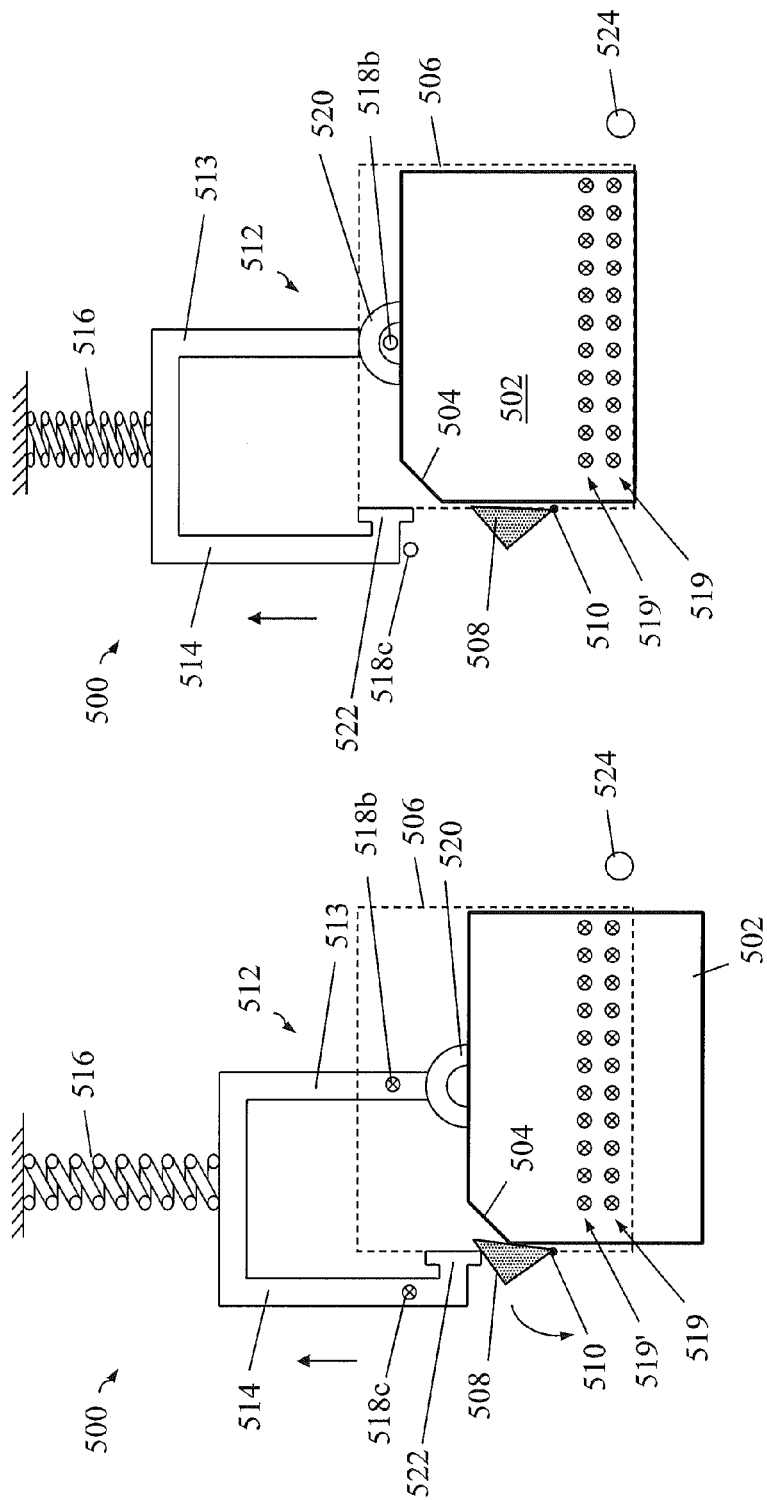

As then shown in FIG. 5(d), further insertion of the card 502 now causes the notch 504 to make contact with the tab 508, and causing the tab to pivot outward from the slot 506, against the bias of the torsion spring 510. Notably, the door 522 attached to the second arm 514 has traveled a sufficient distance upward such that the door 522 does not prevent the card 502 from forcing the tab 508 pivotally outward. Eventually, full insertion of the card 502 as shown in FIG. 5(e) causes the card release mechanism 512 to clear the area above the locking pins 518b and 518c. As a result, the locking pins 518b and 518c each spring up within the slot 506, in turn preventing the card release mechanism 512 from ejecting the card 502 once the user has fully inserted the card 502.

Figures 5F, 5G:
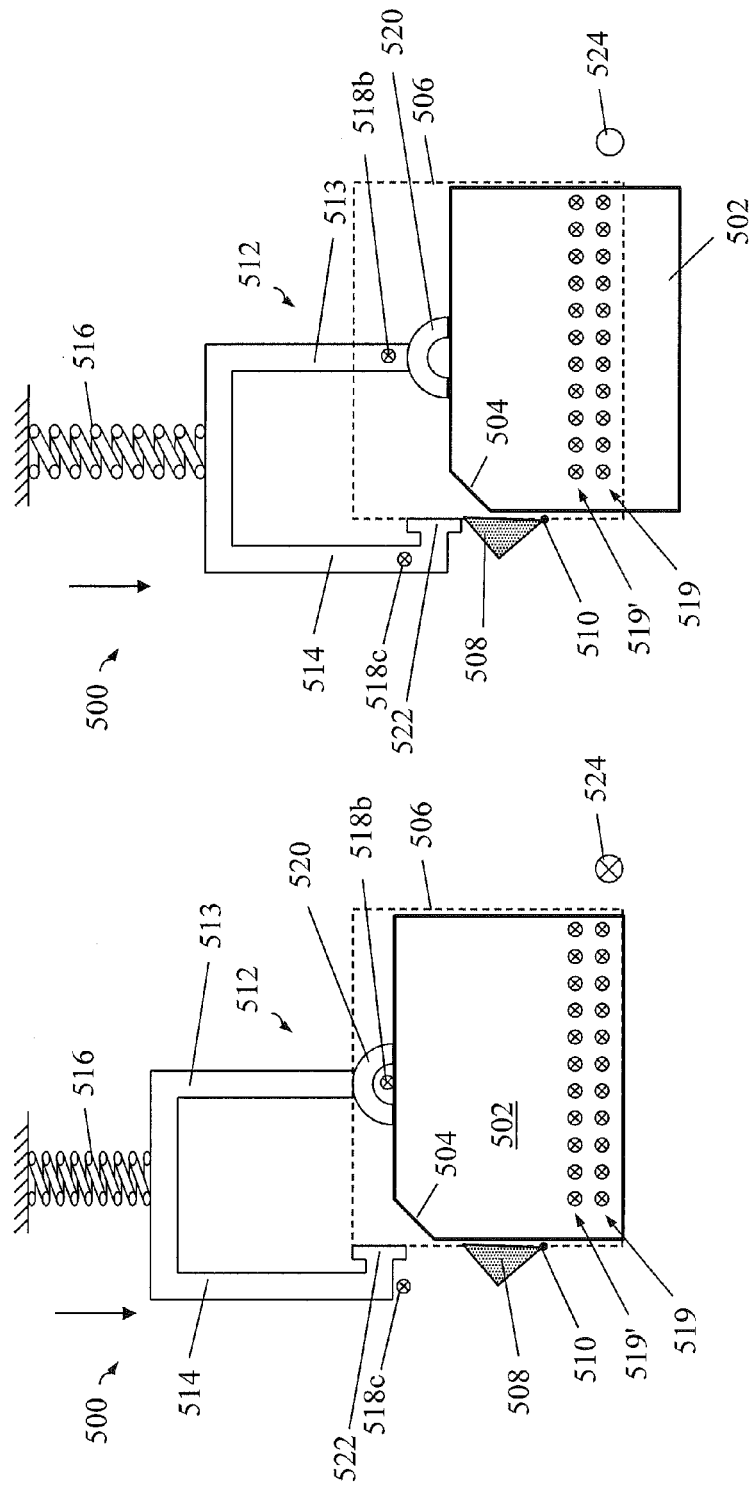
Figures 5H, 5I:
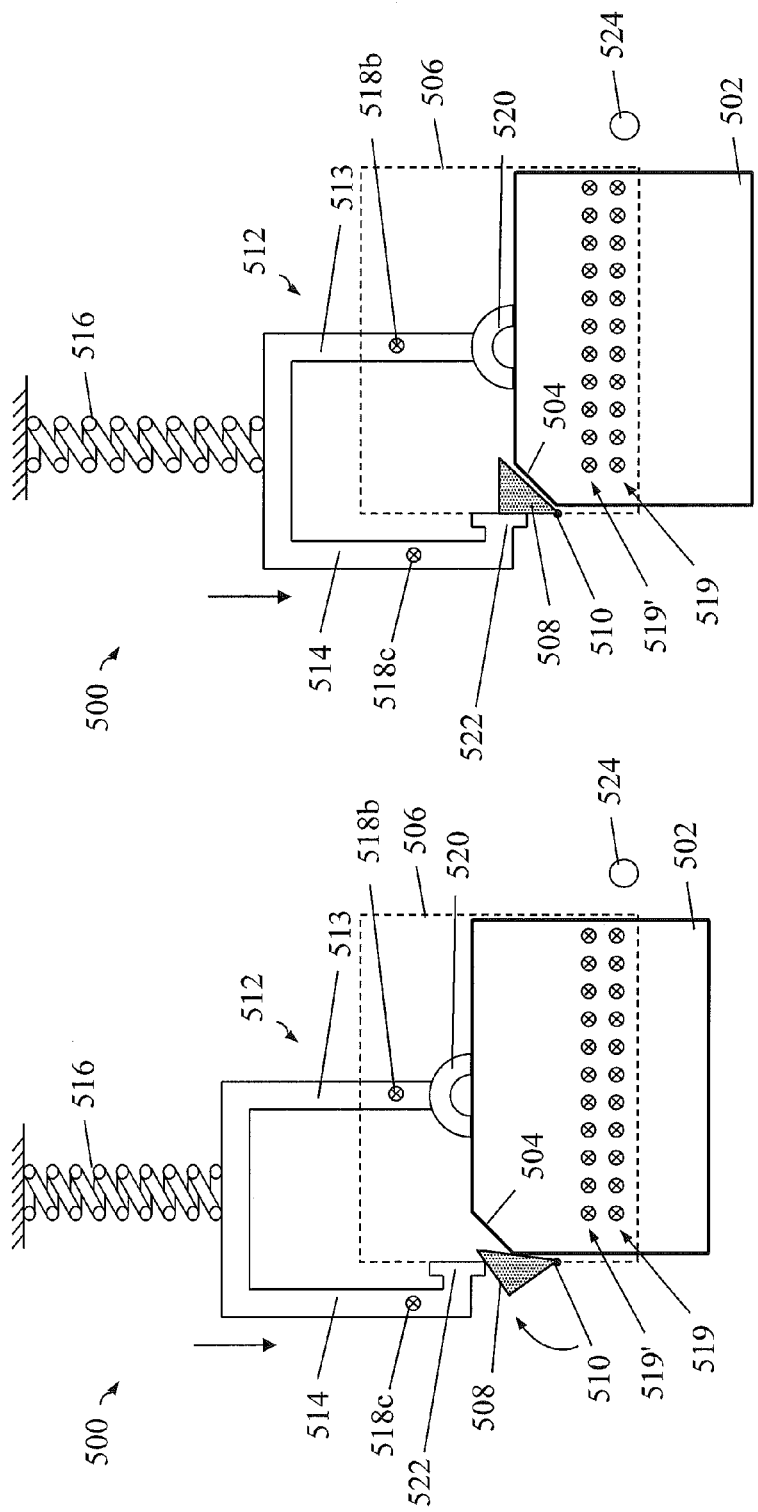

Release of the card 502 may, in one embodiment, be accomplished through the use of the release button 524. By depressing the button 524 as indicated in FIG. 5(f), the locking pins 518b and 518c are each caused to be depressed due to the interlocking relationship therebetween. This allows the card release mechanism 512 to freely move down the card slot by the compressed energy of the biasing spring 516, as shown in FIG. 5(g). As the card 502 continues to be pushed out of the slot 506, the notch 504 begins to move past the outwardly disposed tab 508, which in turn causes the torsion spring 510 to pivotally return the tab 508 back into the slot 506, as illustrated in FIG. 5(h). Here again, the position of the door 522 still permits the tab 508 to pivot back into the slot 506. Finally, in FIG. 5(i), the card release mechanism 512 is completely returned to the unloaded configuration similar to FIG. 5(c), and the card 502 may then be completely pulled out of the slot 506 by the user.

Figures 5J, 5K:
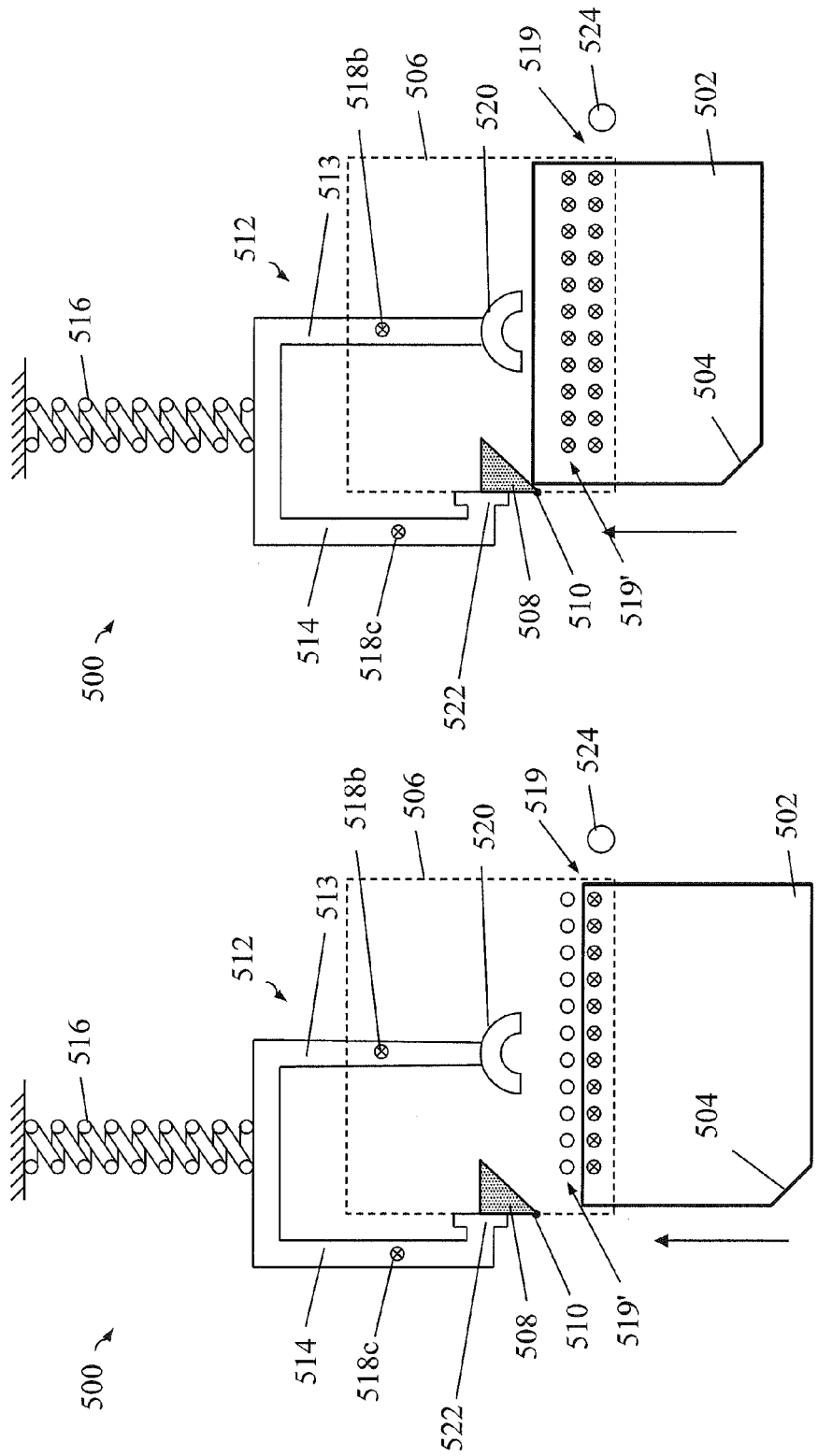

Referring now to FIGS. 5(j) and 5(k), there is illustrated a first exemplary scenario of where the memory card 502 is incorrectly inserted into the slot 506. That is, the notch 504 is not inserted first within the slot (or does not align with the tab 508). In FIG. 5(j), the card is inserted "notch last." Although simultaneous depression of the first row 519 of pins unlocks the second row 519' of pins, further insertion of the card 502 as shown in FIG. 5(k) results in the condition that the top left corner of the card 502 engages the tab 508. However, the door 522 remains in its initial position, thus preventing the tab 508 from being pivoted outward and away from the slot 506. This is because the improper alignment prevents the leading edge of the card 502 from contacting the post 520 and forcing the card release mechanism 512 upward such that the door 522 is moved away from the tab 508. Accordingly, the card 502 goes no further than is shown in FIG. 5(k), and the user is provided with visual and tactile feedback that the card 502 is inserted incorrectly.

Figure 5L:
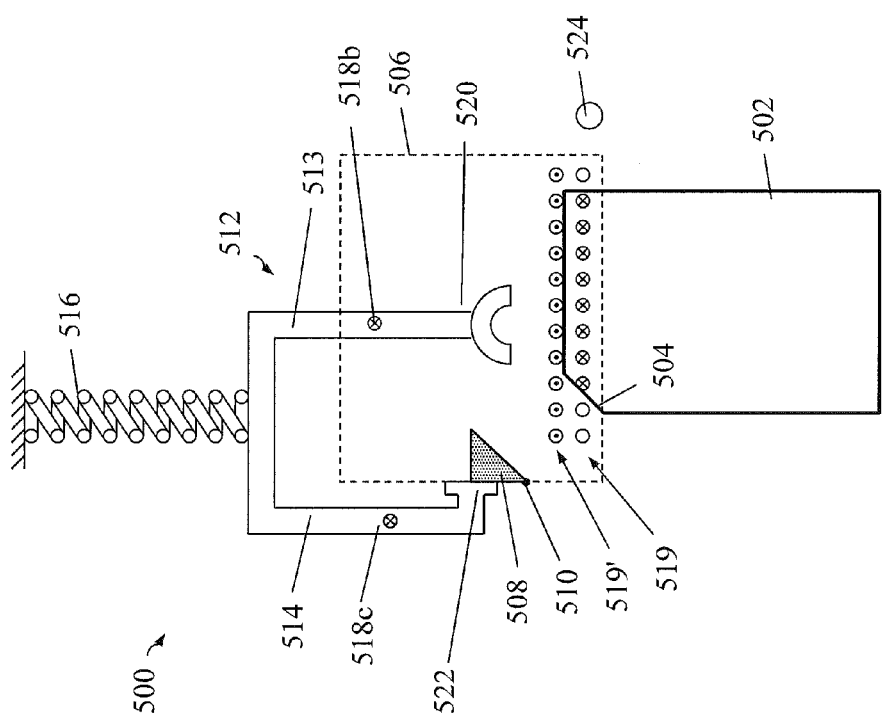

In addition to the possibility that the card 502 could be incorrectly inserted in a landscape orientation, with a landscape slot 506 it is also possible to initially insert the card (incorrectly) in a portrait orientation, as shown in FIG. 5(l). In this case, the card 502 regardless of whether inserted "notch first" or "notch last" will only depress some, but not all, of the first row 519 of pins. Consequently, the second row 519' of pins remains locked, and the card 502 goes no further than is shown in FIG. 5(l).

Figure 6A:
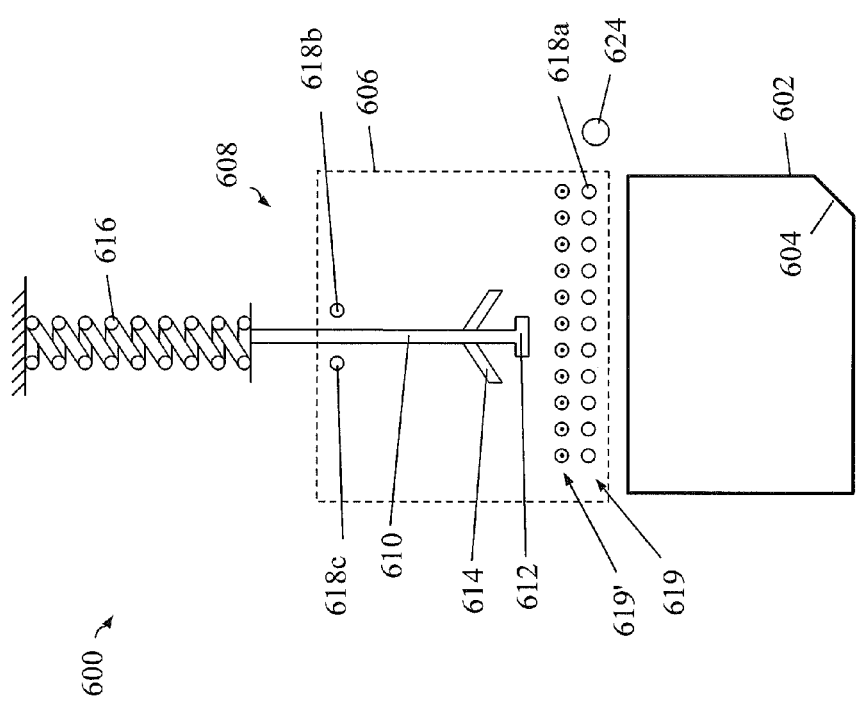
FIGS. 6(a) through 6(p) are a series of schematic diagrams illustrating a fourth exemplary embodiment of a memory card slot mechanism for electronic devices.
Figures 6H, 6I:
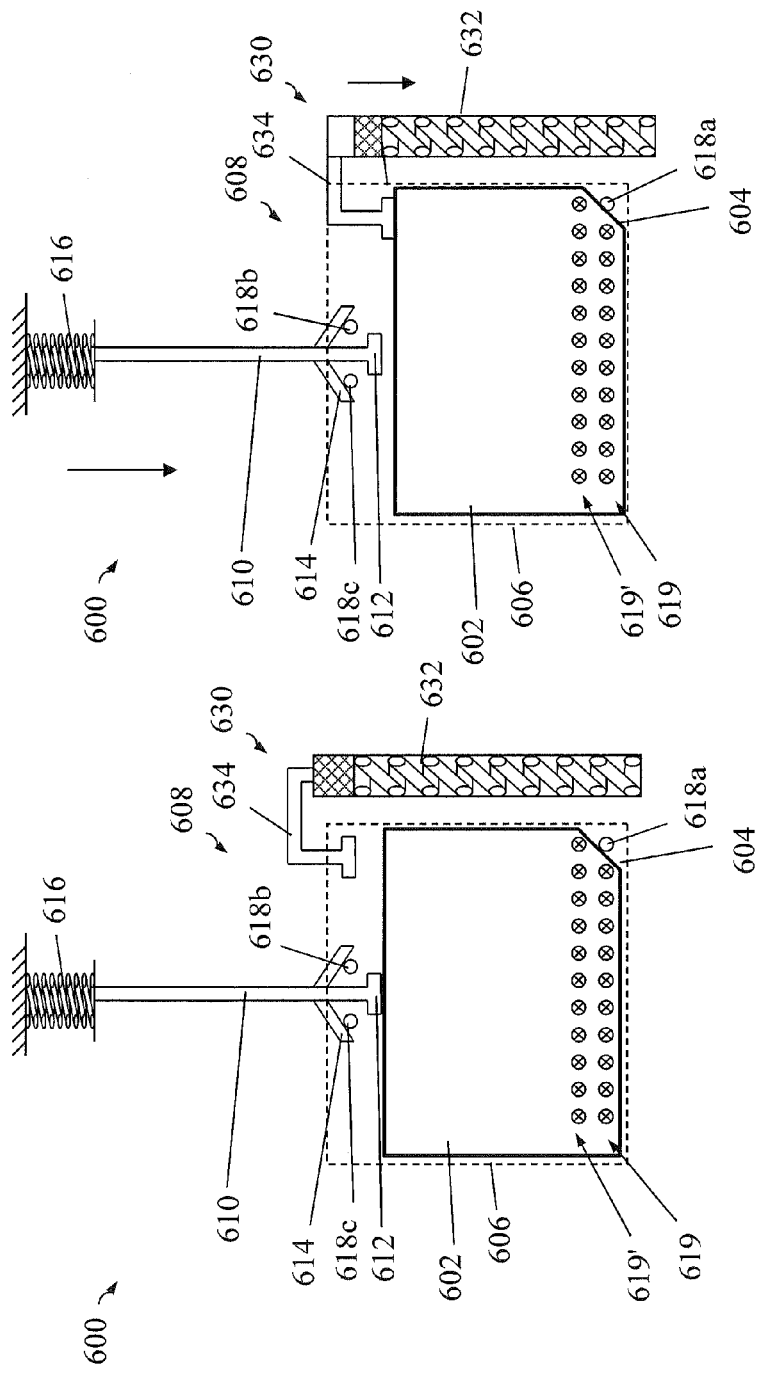
Figures 6J, 6K:
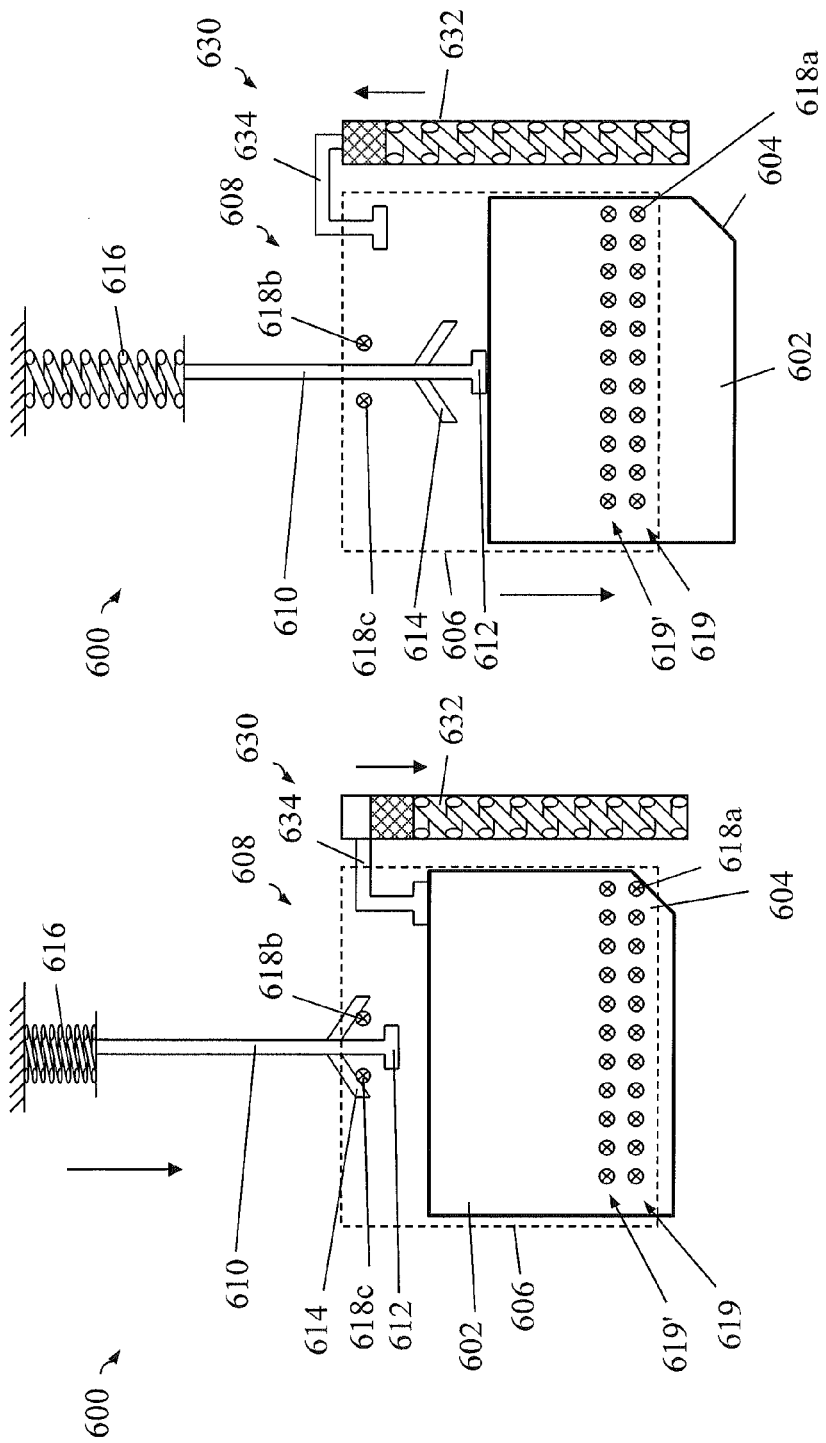
Figures 6N, 6O:
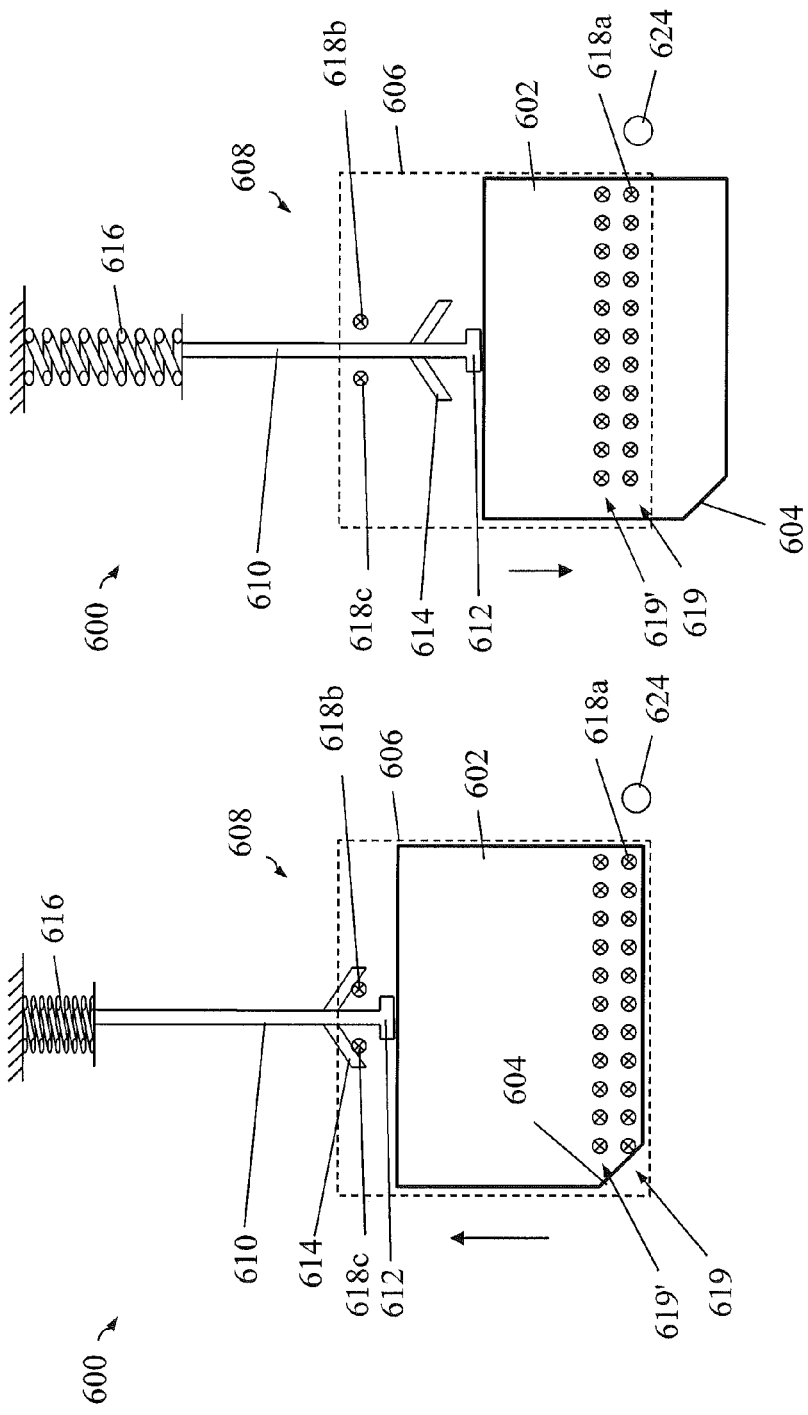
Figure 6P:
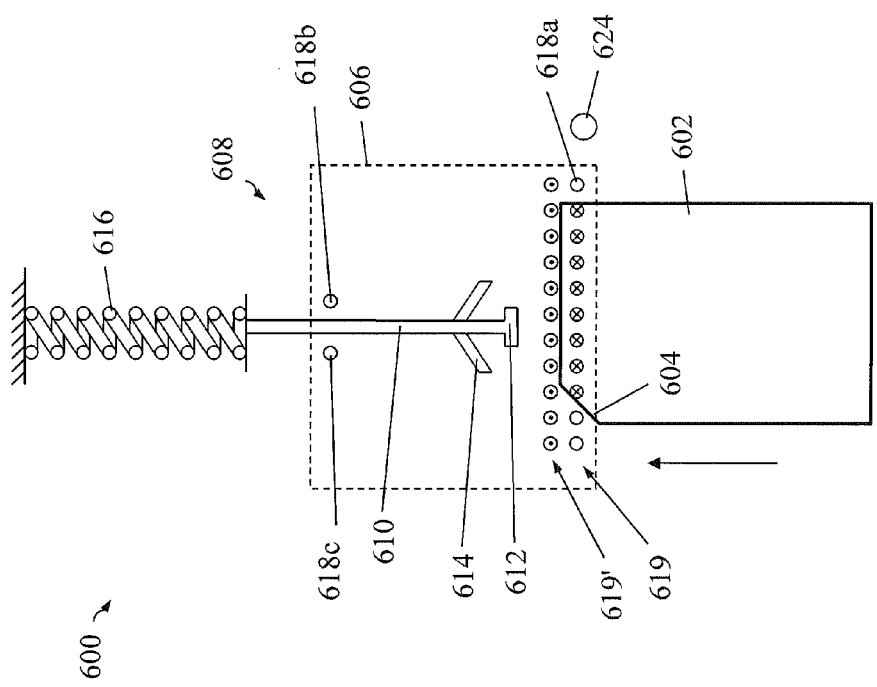

Referring generally now to FIGS. 6(a) through 6(p), there is shown a series of schematic diagrams illustrating a fourth exemplary embodiment of a memory card slot mechanism 600 for electronic devices. In this embodiment, the slot mechanism 600 has a landscape configuration with respect to a rectangular shaped memory card 602 having a notch 604. In contrast to the third embodiment, a correct orientation of the memory card 602 when inserted into the slot 606 of the slot mechanism 600 has the notch side inserted last (as seen in FIG. 6(a)).

As more particularly shown in FIG. 6(a), the slot mechanism 600 further includes a card release mechanism, shown generally at 608, having an arm 610 with a post 612 disposed at a first end thereof. The arm 610 further includes wing portions 614 proximate the post 612. The arm 610 is biased in a downward orientation with respect to FIG. 6(a) by a biasing spring 616 in contact with a second end of the arm 610.

As further shown in FIG. 6(a), the slot mechanism 600 additionally includes three locking pins; a primary pin 618a located at a right front portion of the slot 606, and two secondary pins 618b, 618c, mechanically interlocked with pin 618a, located at a back of the slot 606, on opposing sides of the arm 610. The three locking pins are spring loaded and require very little force to become depressed. As depicted in the figures, where the pins are marked with an "x," they are in a depressed position with respect to the slot 606. That is, the pins do not extend within the slot 606 itself. However, where the pins are not marked with an "x," they are in a released position and the longitudinal axes thereof extend at least partially into the slot 606.

As will also be noted in the present embodiment (and similar to the third embodiment), the slot 606 also includes a first row 619 of spring-loaded pins (including locking pin 618a) located closest to the card slot opening. This first row 619 of pins may be freely depressed by anything that comes in contact with it. There is also a second row 619' of spring-loaded pins located directly behind the first row 619 of pins. The second row 619' of pins may be in one of three states. The first state, which may be referred to as a locked state (depicted with a small dot in the center of each pin in the figures), means that the pin cannot become depressed by anything that comes in contact with it. The second state, which may be referred to as the unlocked state, means that the pin can become depressed by anything that comes in contact with the pin. The third state occurs when the pin becomes fully depressed by whatever comes in contact with that pin (again, denoted with a small "x" in the figures).

Thus, prior to memory card insertion, primary pin 618a (and the other pins in the first row 619) and secondary pins 618b and 618c are in a released position. The second row 619' of pins are in a locked position. As will be explained in further detail below, a release button 624 may also be provided as one embodiment of a card release mechanism, wherein the release button 624 is mechanically interlocked with the locking pins 618a, 618b, 618c.

FIGS. 6(b) through 6(e) illustrate a sequence in which the memory card 602 is inserted into the slot 606 in the correct orientation. That is, the notch 604 is aligned to the location of locking pin 618a when fully inserted. When the card 602 is initially inserted into the card slot 606 as shown in FIG. 6(b), a leading edge of the card 602 causes the primary locking pin 618a (and thus pins 618b and 618c) to become depressed and forced out of the slot 606. Also, because the leading edge of the card 602 depresses the entire first row 619 of pins, this causes the second row 619' of pins to be unlocked, as further shown in FIG. 6(b). As the 602 card moves further within the interior of the slot 606 as shown in FIG. 6(c), the leading edge of the card 602 comes into contact with the post 612, and then begins to move the card release mechanism 608 in an upward direction (i.e., toward the back of the slot 606) against the bias of the biasing spring 616 as shown in FIG. 6(d).

Referring to FIG. 6(e), further insertion of the card 602 now causes the notch 604 to move past the location of locking pin 618a, thereby causing each of the locking pins 618a, 618b and 618c to spring up within the slot 606. Because the wing portions 614 of the arm 610 are now located behind pins 618b and 618c within the slot 606, the card release mechanism 608 is prevented from ejecting the card 602 once the user has fully inserted the card 602.

Release of the card 602 may, in one embodiment, be accomplished through the use of the release button 624. By depressing the button 624 as indicated in FIG. 6(f), the locking pins 618a, 618b and 618c are each caused to be depressed due to the interlocking relationship therebetween. This allows the card release mechanism 608 to freely move down the card slot by the compressed energy of the biasing spring 616, as shown in FIG. 6(g).

In an alternative embodiment, FIGS. 6(h) through 6(k) depict another possible mechanism that may be used to eject the card 602. In this embodiment, the ejection mechanism 630 includes a spring biased slider 632 that is capable of being moved (in a downward direction in the figures) by a user. The slider 632 is coupled to a slider arm 634 that, in a standby position, rests at the back of the slot 606 and clear of any interference with insertion of the card or with the card release mechanism 608. When the slider 632 is engaged by a user as shown in FIG. 6(i), the slider arm 634 engages the back edge of the card 602 and begins to push the card 602 out from the slot 606. The card 602 will then come in contact with locking pin 618a, as shown in FIG. 6(j), causing it to be depressed. Once locking pin 618a becomes depressed, pins 618b and 618c also become depressed as these pins are interlocked as stated above. The card release mechanism 608 is then free to move down the card slot by the compressed energy of the biasing spring 616, as shown in FIG. 6(k), while the spring biased slider 632 returns to its standby position.

Referring now to FIGS. 6(l) through 6(o), there is illustrated a first exemplary scenario of where the memory card 602 is incorrectly inserted into the slot 606. That is, the notch 604 does not align with the locking pin 618a when the card 602 is fully inserted. In FIG. 6(l), regardless of how the card 602 is initially inserted, simultaneous depression of the first row 619 of pins unlocks the second row 619' of pins. In addition, depression of the locking pin 618a leads to depression of locking pins 618b and 618c. Further insertion of the card 602 as shown in FIG. 6(m) results in depression of the second row 619' of pins and engagement with the post 612 of the card release mechanism 608. However, once the card 602 is fully inserted into the slot 606 as shown in FIG. 6(n), it will be seen that the location of the notch 604 does not correspond to the location of the locking pin 618a. As a result, the locking pin 618a remains depressed by the card 602, as do the locking pins 618b and 618c. Therefore, there is nothing to prevent the card release mechanism 608 from ejecting the card 602 due to the bias of spring 616, as shown in FIG. 6(o).

FIG. 6(p) illustrates a second exemplary scenario of where the memory card 602 is incorrectly inserted into the slot 606. More specifically, FIG. 6(p) depicts the card 602 incorrectly inserted in a portrait orientation. Similar to the embodiment of FIG. 5(l), the card 602, regardless of whether inserted "notch first" or "notch last" will only depress some, but not all, of the first row 619 of pins. Consequently, the second row 619' of pins remains locked, and the card 602 goes no further than is shown in FIG. 6(p).

Referring generally now to FIGS. 7(a) through 7(k), there is shown a series of schematic diagrams illustrating a fifth exemplary embodiment of a memory card slot mechanism 700 for electronic devices. In this embodiment, the slot mechanism 700 has a landscape configuration with respect to a rectangular shaped memory card 702 having a notch 704. In contrast to the fourth embodiment, a correct orientation of the memory card 702 when inserted into the slot 706 of the slot mechanism 700 has the notch side inserted first. However, in contrast to the third embodiment, no pivoting tab is utilized.

Figure 7A:
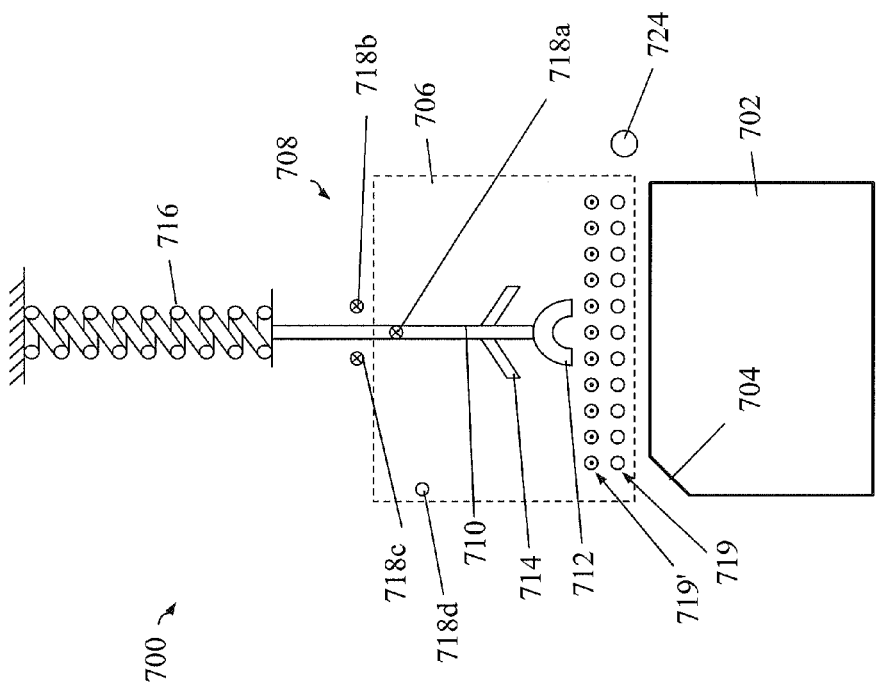
FIGS. 7(a) through 7(k) are a series of schematic diagrams illustrating a fifth exemplary embodiment of a memory card slot mechanism for electronic devices.

As particularly shown in FIG. 7(a), the slot mechanism 700 further includes a card release mechanism, shown generally at 708, having an arm 710 with a c-shaped post 712 disposed at a first end thereof. The arm 710 further includes wing portions 714 proximate the post 712. The arm 710 is biased in a downward orientation with respect to FIG. 7(a) by a biasing spring 716 in contact with a second end of the arm 710.

As further shown in FIG. 7(a), the slot mechanism 700 additionally includes four locking pins; a primary pin, 718a, two secondary pins, 718b, 718c and an orientation pin 718d. The secondary pins 718b, 718c are mechanically interlocked with pin 718a. The orientation pin 718d is mechanically interlocked with pin 718a such that when orientation pin 718d becomes depressed, so does pin 718a. However, when pin 718d is in a released position, it has no effect on whether pin 718a is in a released state. As depicted in the figures, where the pins are marked with an "x," they are in a depressed position with respect to slot 706. Thus, prior to card insertion, secondary pins 718b and 718c are held in a depressed position due to the arm 710 depressing primary pin 718a. However, orientation pin 718d is in a released position as nothing is making contact with that pin.

The slot 706 includes a first row 719 of pins that may be freely depressed by anything that comes in contact with it. A second row 719' of pins, directly behind the first row 719, may be in one of three states. A first state may be a locked state, where the pins may not be depressed by anything that comes in contact with it. A second state may be an unlocked state, where the second row 719' of pins can be freely depressed by anything that comes in contact with it. In addition, a third state, referred to as a depressed state, occurs when the pins are being depressed by something which comes in contact with those pins (e.g., a card). The second row 719' of pins are mechanically linked with the first row 719 of pins such that they only go into an unlocked state when all pins in the first row 719 become depressed. As will be explained in further detail below, a release button 724 may also be provided as one embodiment of a card release mechanism, wherein the release button 724 is mechanically interlocked with the locking pins 718a, 718b, 718c.

Figures 7B, 7C:
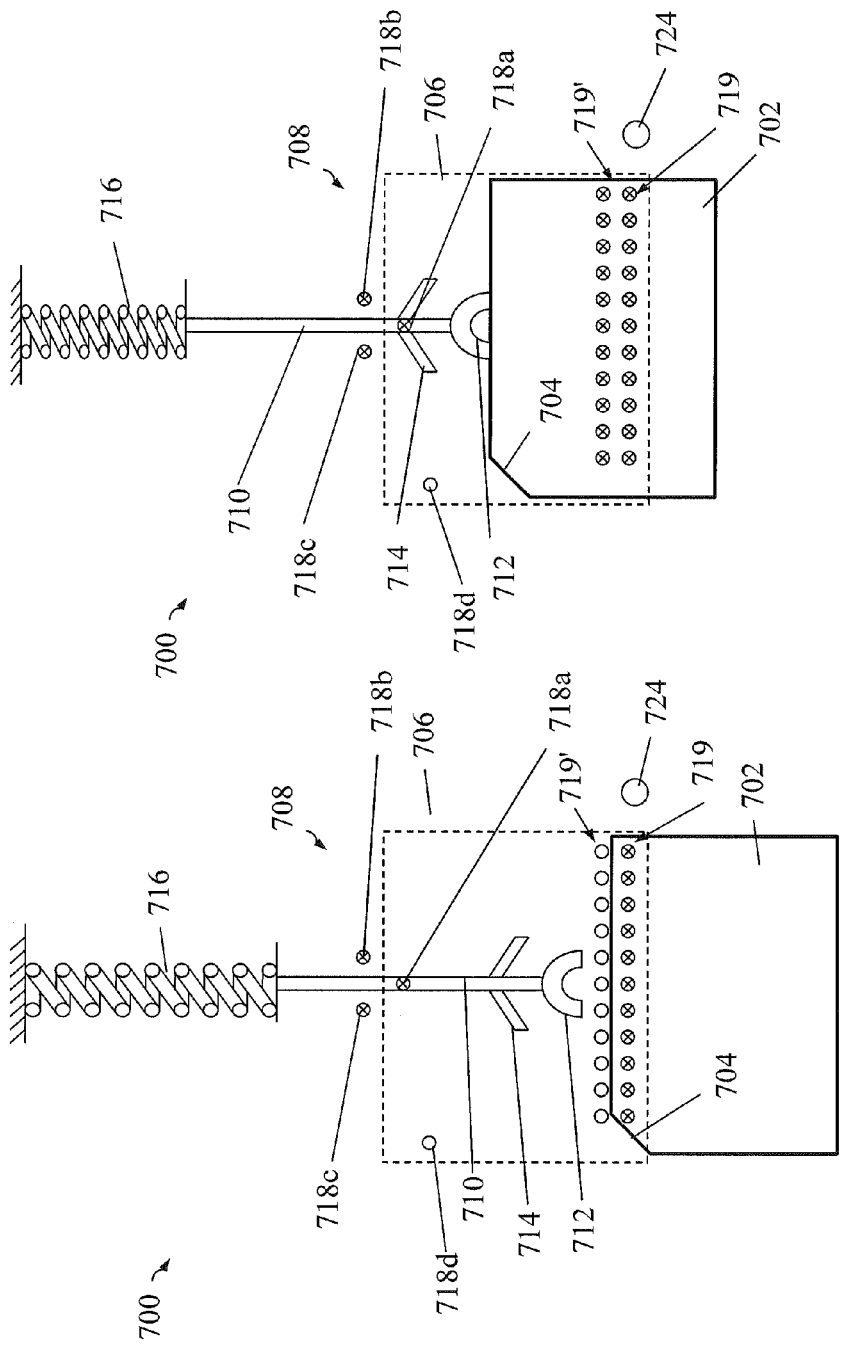
Figure 7D:
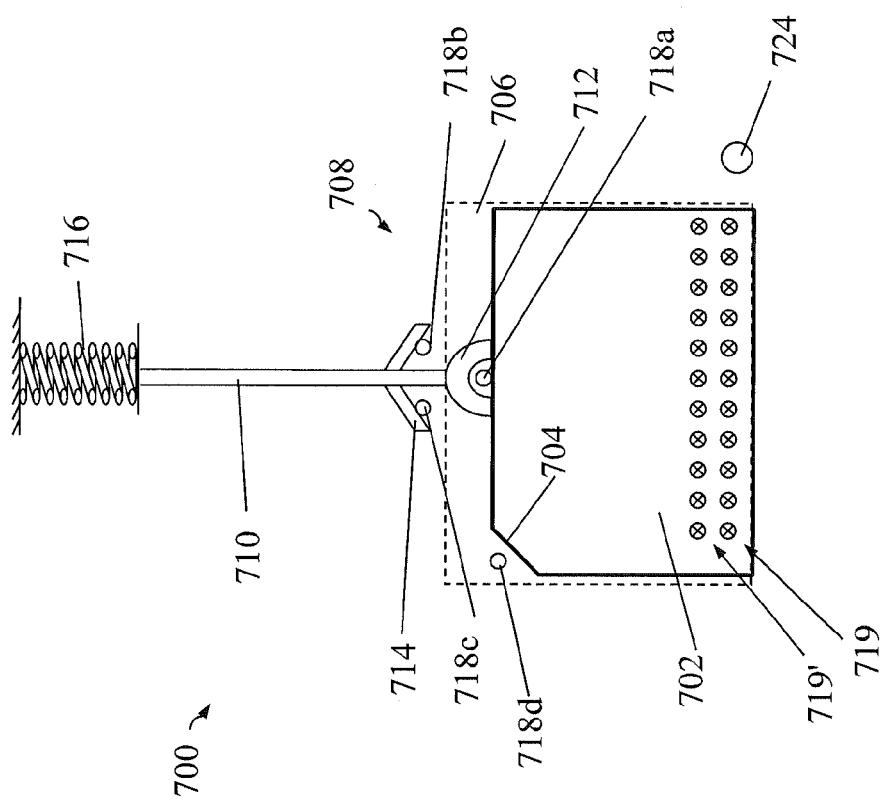

FIGS. 7(b) through 7(d) illustrate a sequence in which the card 702 is inserted into slot 706 in the correct orientation. That is, the notch 704 is aligned with the orientation pin 718d within the slot 706. When the card 702 is initially inserted into the card slot 706 as shown in FIG. 3(b), a leading edge of the card 702 makes contact with and depresses all of the first row 719 of pins. This causes the second row 719' to be in an unlocked state. Further insertion of the card causes the leading edge of the card to make contact with and depress each pin in the second row 719', as shown in FIG. 7(c). Further insertion of the card 702 then causes the leading edge of the card to make contact with the post 712, thereby moving the card release mechanism 708 in an upward direction (i.e., toward the back of the slot 706) against the bias of the biasing spring 716 as also shown in FIG. 7(c).

Further insertion of the card 702, as shown in FIG. 7(d), causes the post 712 to clear primary pin 718a, thus causing pin 718a to become released. At the same time, the wing portions 714 of the card release mechanism 708 clear the secondary pins, 718b, 718c, causing those pins to be released. In addition, when the card 702 is fully inserted, it does not make contact with the orientation pin 718d due to the notch 704 aligning therewith. Since the primary pin 718a and the secondary pins, 718b, 718c are all in a released position, the card release mechanism 708, is prevented from ejecting the card 702.

Figure 7E:
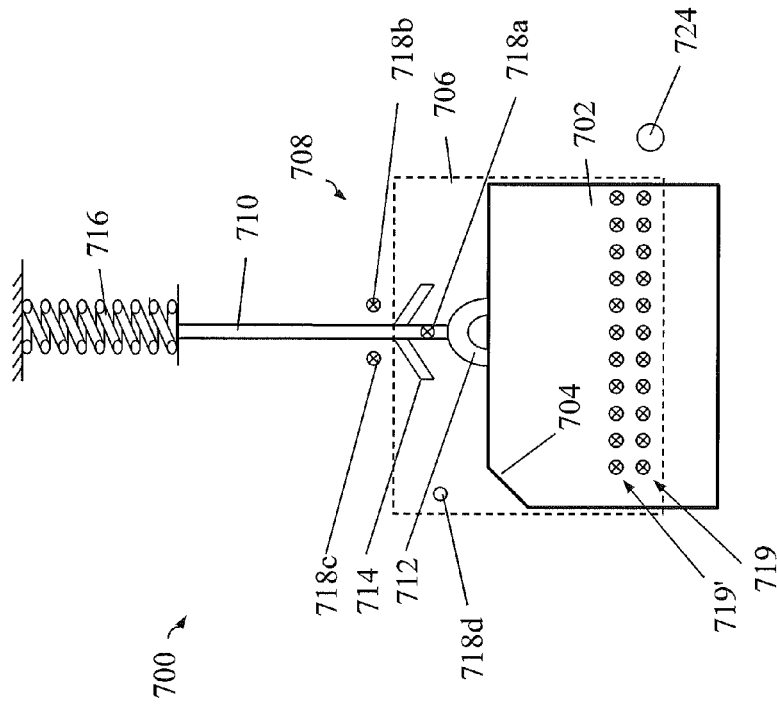
Figure 7F:
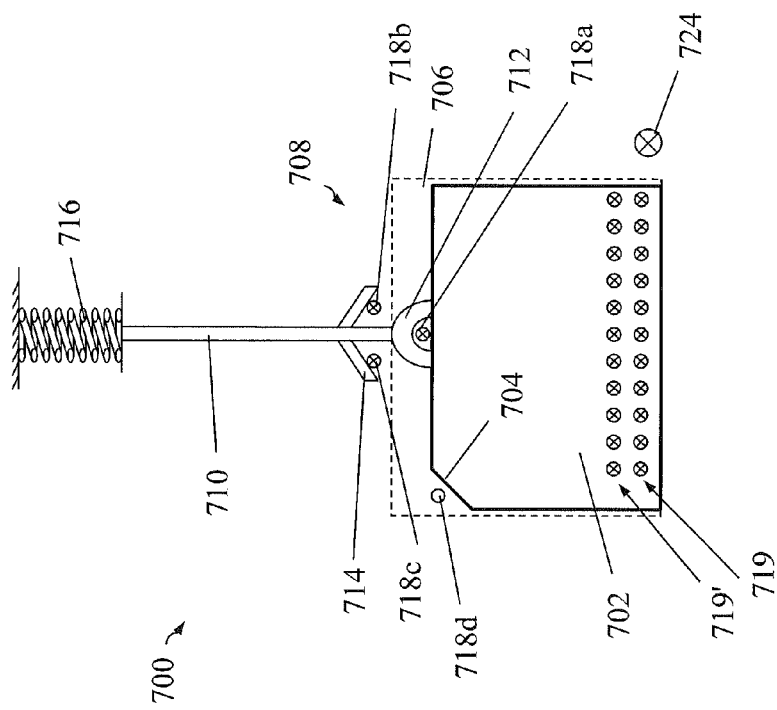

Release of the card 702 may, in one embodiment, be accomplished through the use of the release button 724. By depressing the button 724, as indicated in FIG. 7(e), the locking pins 718a, 718b, and 718c are each caused to be depressed due to the interlocking relationship therebetween. This allows the card release mechanism 708 to freely move down the card slot by the compressed energy of the biasing spring 716, as shown in FIG. 7(f). As the post 712 and the arm 710 slide past the primary locking pin 718a, the primary locking pin 718a remains depressed, causing the secondary locking pins 718b, 718c, to remain depressed as well due to the interlocking relationship therebetween.

Figure 7G:
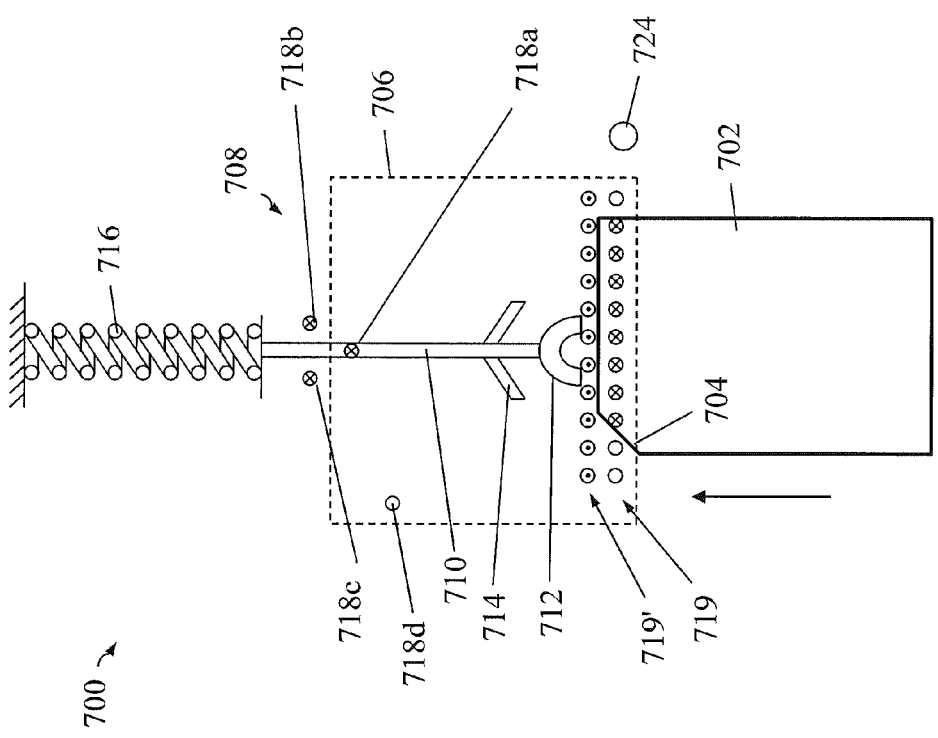
Figure 7H:
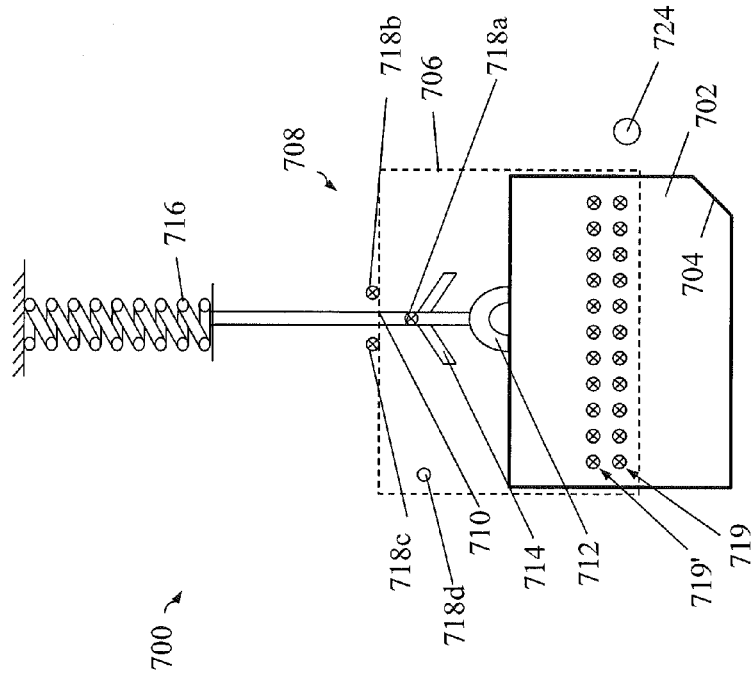

FIG. 7(g) illustrates an exemplary scenario of where the card is incorrectly inserted into the slot 706. More specifically, FIG. 7(g) depicts the card 702 incorrectly inserted in a portrait orientation. Similar to the embodiment of FIG. 5(l), the card 702, regardless of whether inserted "notch first," or "notch last," will only depress some, but not all, of the first row 719 of pins. Consequently, the second row 719' of pins remains locked, and the card 702 goes no further than is shown in FIG. 7(g).

Figure 7I:
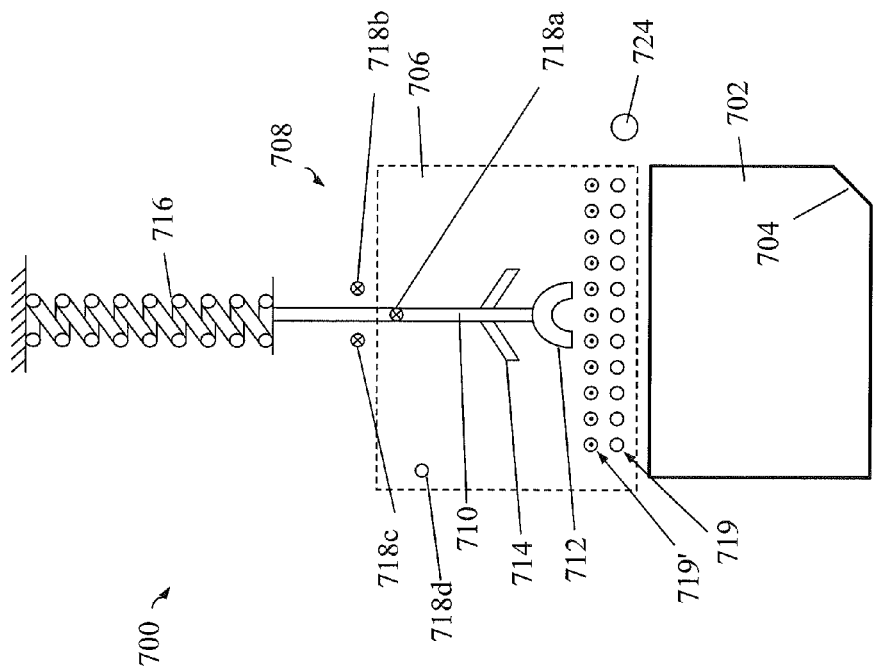
Figure 7K:
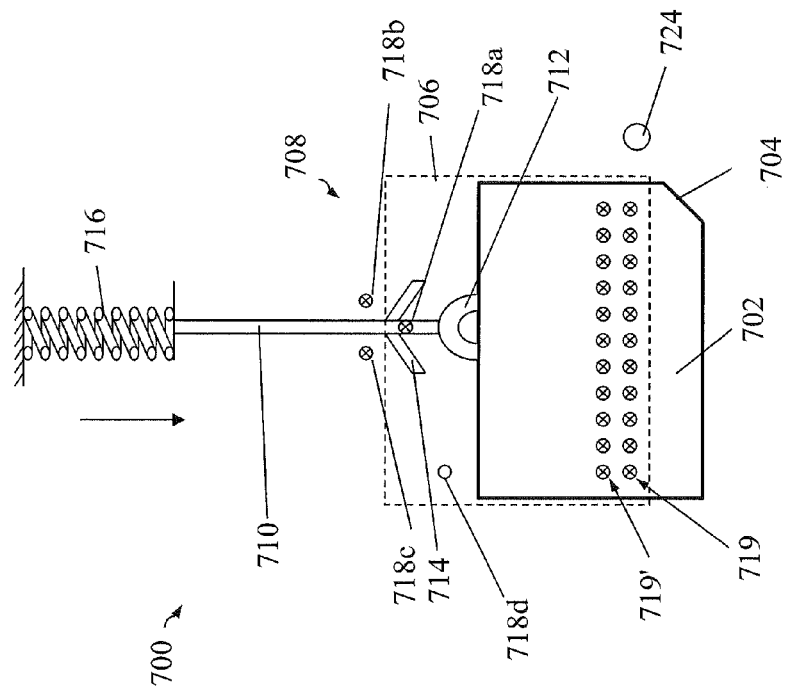

Finally, FIGS. 7(h) through 7(k) illustrate a second exemplary scenario of where the card 702 is incorrectly inserted into the slot 706. That is, the notch 704 does not align with the orientation pin 718d when the card 702 is fully inserted. In FIG. 7(i), regardless of how the card 702 is initially inserted, simultaneous depression of the first row 719 of pins unlocks the second row 719' of pins. This allows the card 702 to make contact with the post 712, causing the card release mechanism 708 to move in an upward direction (i.e., toward the back of the slot 706), against the bias of the biasing spring 716.

Figure 7J:
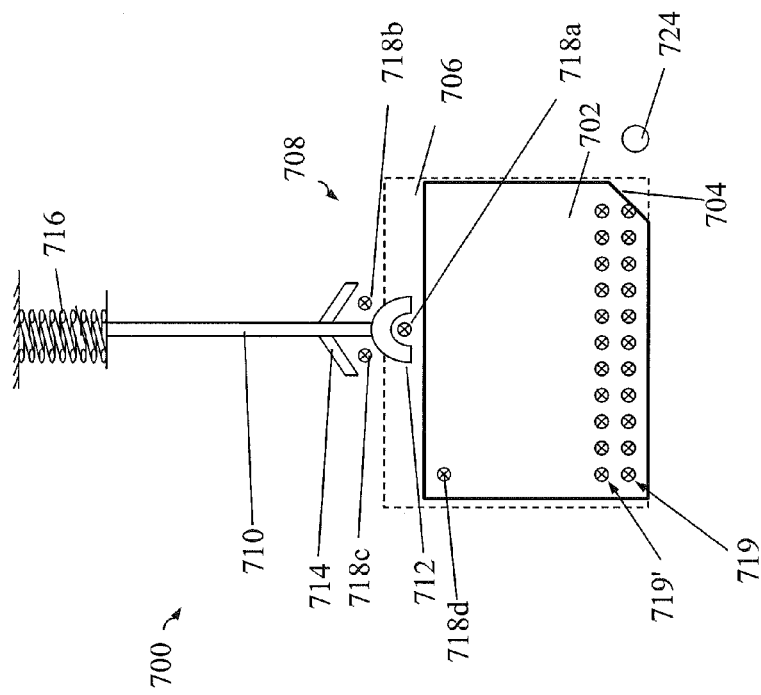

Further insertion of the card, as seen in FIG. 7(j) causes the post, 712 to clear the primary pin 718a, causing pin 718a to become released. At the same time, the wing portions 714 of the card release mechanism 708 clear the secondary pins, 718b, 718c, causing those pins to become depressed. However, since the notch 704 of the card does not align with orientation pin 718d, the card also depresses orientation pin

718*d*. Thus, primary pin 718*a* becomes depressed due to the mechanical interlock with orientation pin 718*d*. Further, since secondary pins 718*b*, 718*c* are mechanically interlocked with primary pin 718*a*, the secondary pins also become depressed. Since there are no pins obstructing the card release mechanism, 708, the card release mechanism can eject the card using the energy stored in the bias spring 716, as seen in FIG. 7(*k*).

As will thus be appreciated, an exemplary card slot mechanism for an electronic device adapted to receive a card therein is disclosed. The slot mechanism includes a slot disposed within the electronic device; a pivotally moveable tab that is spring biased to protrude within an interior of the slot; and a spring biased card release mechanism, including a first arm disposed within the interior of the slot and a second arm disposed exterior to the slot; wherein the second arm is configured to prevent movement of the pivotally moveable tab by the card when the card is inserted in an incorrect orientation, thereby preventing complete insertion of the card, and wherein the first arm is configured to allow movement of the pivotally moveable tab by the card when the card is inserted in a correct orientation, thereby allowing complete insertion of the card.

As will be further appreciated, another exemplary slot mechanism for an electronic device adapted to receive a card therein includes a slot disposed within the electronic device. A spring biased card release mechanism has an arm with a post disposed at a first end thereof. The arm is partially disposed within an interior of the slot, and further includes wing portions disposed proximate the post. A first locking pin is located at a front of the slot, and second and third locking pins are located at a back of the slot, disposed at opposing sides of the arm, the second and third locking pins mechanically interlocked with the first locking pin. The first locking pin is configured to be depressed from an initial released position by insertion of the card such that depression of the first locking pin also causes depression of the second and third locking pins from the released position. Upon successful complete insertion of the memory card into the slot, the first, second and third locking pins are caused to be returned to the released position, thereby preventing the card release mechanism from ejecting the memory card.

As will thus be appreciated, the above described embodiments allow an electronic device to become better aware when a card is inserted incorrectly, even before device power up, or receiving an error indication or an inability to register with a network, for example. As a result, the user is less likely to experience an unsatisfactory "out-of-box" experience.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A slot mechanism for an electronic device adapted to receive a card therein, the slot mechanism comprising:
   a slot disposed within the electronic device;
   a pivotally moveable tab that is spring biased to protrude into an interior of the slot; and
   a spring biased card release mechanism including a first arm disposed within the interior of the slot and a second arm disposed exterior to the slot;
   wherein the second arm is configured to prevent movement of the pivotally moveable tab by the card when the card is inserted in an incorrect orientation, thereby preventing complete insertion of the card;
   and wherein the first arm is configured to allow movement of the pivotally moveable tab by the card when the card is inserted in a correct orientation, thereby allowing complete insertion of the card.

2. The slot mechanism of claim 1, further comprising:
   a first locking pin located at a front of the slot, a second locking pin located at a back of the slot, and a third locking pin located exterior to the slot, the second and third locking pins mechanically interlocked with the first locking pin;
   the first locking pin configured to be depressed from an initial released position by insertion of the card such that depression of the first locking pin also causes depression of the second and third locking pins from a released position;
   wherein, upon successful complete insertion of the card into the slot, the first, second and third locking pins are caused to be returned to the released position, thereby preventing the card release mechanism from ejecting the card.

3. The slot mechanism of claim 1, wherein the card release mechanism is configured such that a notch part of the card aligns with the tab when the card is inserted correctly, thereby causing a leading edge of the card to engage the first arm and move the second arm away from the tab, allowing the tab to be pivotally moved out of the slot by the card.

4. The slot mechanism of claim 3, wherein the card release mechanism is configured such that the notch part of the card fails to align with the tab when the card is inserted incorrectly, thereby preventing the leading edge of the card to engage the first arm and move the second arm away from the tab, in turn preventing the tab from being pivotally moved out of the slot by the card.

5. The slot mechanism of claim 2, further comprising a release button interlocked with the first, second and third locking pins such that depression of the release button causes depression of the first, second and third locking pins, causing the card release mechanism to eject the card.

6. The slot mechanism of claim 1, wherein during ejection of the card, the pivotally moveable tab is caused to return back into the slot.

7. The slot mechanism of claim 1, wherein the slot is shaped to receive correct insertion of the card in one of a portrait orientation and a landscape orientation.

8. The slot mechanism of claim 7, further comprising:
   a first row of pins located at a front of the slot; and
   a second row of pins located behind the first row of pins, wherein the second row of pins is configured to be locked until each pin of the first row of pins is caused to be depressed.

9. The slot mechanism of claim 8, wherein improper insertion of the card in a portrait orientation prevents simultaneous depression of each pin of the first row of pins such that the card is prevented from advancing beyond the second row of pins.

10. A slot mechanism for an electronic device adapted to receive a card therein, the slot mechanism comprising:
   a slot disposed within the electronic device;
   a spring biased card release mechanism having an arm with a post disposed at a first end thereof;

the arm partially disposed within an interior of the slot, and further comprising wing portions disposed proximate the post;

a first locking pin located at a front of the slot, and second and third locking pins located at a back of the slot and disposed at opposing sides of the arm, the second and third locking pins mechanically interlocked with the first locking pin;

the first locking pin configured to be depressed from an initial released position by insertion of the card such that depression of the first locking pin also causes depression of the second and third locking pins from a released position;

wherein, upon successful complete insertion of the card into the slot, the first, second and third locking pins are caused to be returned to the released position, thereby preventing the card release mechanism from ejecting the card.

11. The slot mechanism of claim 10, wherein the card release mechanism is configured such that a notch part of the card aligns with the first locking pin when the card is inserted correctly, thereby allowing the first locking pin to return to the released position, in turn causing the second and third locking pins to return to the released position such that the second and third locking pins engage the wing portions of the arm and prevent the card release mechanism from ejecting the card.

12. The slot mechanism of claim 11, wherein the card release mechanism is configured such that the notch part of the card fails to align with the first locking pin when the card is inserted incorrectly, thereby preventing the first locking pin from returning to the released position, in turn preventing the second and third locking pins from returning to the released position such that the card release mechanism is caused to eject the card.

13. The slot mechanism of claim 10, further comprising a release button interlocked with the first, second and third locking pins such that depression of the release button causes depression of the first, second and third locking pins, and causing the card release mechanism to eject the card.

14. The slot mechanism of claim 10, further comprising:
a spring biased slider coupled to a slider arm;
the slider arm, when in a standby position, being configured to rest at the back of the slot clear of any interference with insertion of the card or with the card release mechanism; and
the slider configured such that, upon engagement thereof, the slider arm engages a back edge of the card so to push the card in an outward direction with respect to the slot, in turn causing the card to come in contact with the first locking pin, thereby causing depression of the first, second and third locking pins, and the card release mechanism to eject the card.

15. The slot mechanism of claim 10, wherein the slot is shaped to receive correct insertion of the card in one of a portrait orientation and a landscape orientation.

16. The slot mechanism of claim 10, further comprising:
a first row of pins located at a front of the slot; and
a second row of pins located behind the first row of pins, wherein the second row of pins is configured to be locked until each pin of the first row of pins is caused to be depressed.

17. The slot mechanism of claim 16, wherein improper insertion of the card in a portrait orientation prevents simultaneous depression of each pin of the first row of pins such that the card is prevented from advancing beyond the second row of pins.

18. The slot mechanism of claim 10, further comprising:
an orientation pin located at the back of the slot and mechanically interlocked with the first locking pin such that depression of the orientation pin also causes depression of the first pin;
the orientation pin located so as to become depressed during improper insertion of the card, thereby causing the spring biased card release mechanism to release the card.

19. An electronic device, comprising:
a housing; and
a slot mechanism disposed within the housing and adapted to receive a card therein, the slot mechanism comprising:
a slot;
a pivotally moveable tab that is spring biased to protrude within an interior of the slot; and
a spring biased card release mechanism including a first arm disposed within the interior of the slot and a second arm disposed exterior to the slot;
wherein the second arm is configured to prevent movement of the pivotally moveable tab by the card when the card is inserted in an incorrect orientation, thereby preventing complete insertion of the card;
and wherein the first arm is configured to allow movement of the pivotally moveable tab by the card when the card is inserted in a correct orientation, thereby allowing complete insertion of the card.

20. The electronic device of claim 19, further comprising:
a first locking pin located at a front of the slot, and second and third locking pins located at a back of the slot and disposed at opposing sides of the arm, the second and third locking pins mechanically interlocked with the first locking pin;
the first locking pin configured to be depressed from an initial released position by insertion of the card such that depression of the first locking pin also causes depression of the second and third locking pins from a released position;
wherein, upon successful complete insertion of the card into the slot, the first, second and third locking pins are caused to be returned to the released position, thereby preventing the card release mechanism from ejecting the card.

* * * * *